United States Patent
Clarke

(10) Patent No.: US 9,280,960 B1
(45) Date of Patent: Mar. 8, 2016

(54) NAVIGATING MUSIC USING AN INDEX INCLUDING MUSICAL SYMBOLS

(71) Applicant: Amazon Technologies, Inc., Seattle, WA (US)

(72) Inventor: Frederick Hughes Clarke, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/570,382

(22) Filed: Dec. 15, 2014

(51) Int. Cl.
*G10H 7/00* (2006.01)
*G10G 1/00* (2006.01)
*G09B 15/02* (2006.01)

(52) U.S. Cl.
CPC *G10G 1/00* (2013.01); *G09B 15/02* (2013.01); *G10H 7/00* (2013.01); *G10H 2210/086* (2013.01); *G10H 2220/005* (2013.01); *G10H 2220/015* (2013.01)

(58) Field of Classification Search
USPC ........................................................ 84/483.1
IPC ...... G10H 7/00,2210/086, 2220/005, 2220/015; G10G 1/00
See application file for complete search history.

(56) References Cited

U.S. PATENT DOCUMENTS

| | | | | |
|---|---|---|---|---|
| 4,350,070 A | * | 9/1982 | Bahu | 84/612 |
| 5,146,833 A | * | 9/1992 | Lui | 84/462 |
| 5,400,687 A | * | 3/1995 | Ishii | 84/477 R |
| 5,402,339 A | * | 3/1995 | Nakashima et al. | |
| 5,621,538 A | * | 4/1997 | Gnant et al. | 386/207 |
| 5,665,927 A | * | 9/1997 | Taki et al. | 84/609 |
| 5,689,077 A | * | 11/1997 | Jasinski | 84/477 R |
| 5,706,363 A | * | 1/1998 | Kikuchi | 382/113 |
| 5,728,960 A | * | 3/1998 | Sitrick | 84/477 R |
| 5,760,323 A | * | 6/1998 | Romero et al. | 84/470 R |
| 5,773,741 A | * | 6/1998 | Eller et al. | 84/609 |
| 5,963,957 A | * | 10/1999 | Hoffberg | 369/13.11 |
| 6,051,769 A | * | 4/2000 | Brown, Jr. | 84/477 R |
| 6,072,114 A | * | 6/2000 | Kunimasa | 84/477 R |
| 6,084,168 A | * | 7/2000 | Sitrick | 84/477 R |
| 6,348,648 B1 | * | 2/2002 | Connick, Jr. | 84/477 R |
| 6,380,471 B2 | * | 4/2002 | Matsumoto | 84/477 R |

(Continued)

OTHER PUBLICATIONS

Beethoven; Complete Piano Sonatas. Ed. Heinrich Schenker vol. II.*

(Continued)

*Primary Examiner* — David Warren
(74) *Attorney, Agent, or Firm* — Seyfarth Shaw LLP; Ilan N. Barzilay; Cyrus A. Miller

(57) ABSTRACT

A device is configured to display images of sheet music or electronic sheet music. The device may generate and display an index including markers, locations of markers and series of notes associated with the markers. The device may link directly to a particular image of the sheet music or a particular location in the electronic sheet music using the index. The device may identify musical symbols displayed in the sheet music and generate electronic musical symbols associated with the musical symbols. The device may modify the electronic musical symbols and display the modified electronic musical symbols superimposed over the images of sheet music. The device may generate and output audio using the electronic musical symbols. The device may detect a series of pitches and display the sheet music or electronic sheet music based on a most recent pitch in the series of pitches.

20 Claims, 25 Drawing Sheets

(56) References Cited

U.S. PATENT DOCUMENTS

| | | | |
|---|---|---|---|
| 6,392,132 B2* | 5/2002 | Uehara | 84/477 R |
| 6,414,231 B1* | 7/2002 | Miyamoto et al. | 84/477 R |
| 6,483,019 B1* | 11/2002 | Hamilton | 84/477 R |
| 6,635,815 B2* | 10/2003 | Kosakaya et al. | 84/471 R |
| 7,119,266 B1* | 10/2006 | Bittner et al. | 84/477 R |
| 7,703,014 B2* | 4/2010 | Funaki | 715/269 |
| 7,888,578 B2* | 2/2011 | Guo et al. | 84/609 |
| 8,389,843 B2* | 3/2013 | Berkovitz | 84/602 |
| 8,669,456 B2* | 3/2014 | Clarke et al. | 84/477 R |
| 8,779,269 B2* | 7/2014 | Yamazaki | 84/609 |
| 8,835,741 B2* | 9/2014 | Zhonggang | 84/746 |
| 8,878,040 B2* | 11/2014 | Araki et al. | 84/601 |
| 2001/0022127 A1* | 9/2001 | Chiurazzi et al. | 84/47 |
| 2003/0100965 A1* | 5/2003 | Sitrick et al. | 700/83 |
| 2003/0110925 A1* | 6/2003 | Sitrick et al. | 84/477 R |
| 2004/0159212 A1* | 8/2004 | Terada | 84/477 R |
| 2008/0060507 A1* | 3/2008 | Welchering | 84/645 |
| 2008/0302233 A1* | 12/2008 | Ding et al. | 84/609 |
| 2011/0003638 A1* | 1/2011 | Lee et al. | 463/35 |
| 2013/0000463 A1* | 1/2013 | Grover | 84/483.2 |
| 2013/0005470 A1* | 1/2013 | Evans et al. | 463/37 |
| 2013/0319209 A1* | 12/2013 | Good et al. | 84/483.2 |
| 2014/0088341 A1* | 3/2014 | Altman et al. | 600/27 |
| 2014/0320442 A1* | 10/2014 | Chan et al. | 345/174 |

OTHER PUBLICATIONS

Notation Software, Notation Composer, http://www.notation.com/NotationComposer.php, Jul. 21, 2015.

Notation Software, Notation Musician, http://www.notation.com/NotationMusician.php, Jul. 21, 2015.

Notation Musician 3 User Guide, Notation Software Germany UG, pp. 1-480.

Notation Composer 3 User Guide, Notation Software Germany UG, pp. 1-673.

* cited by examiner

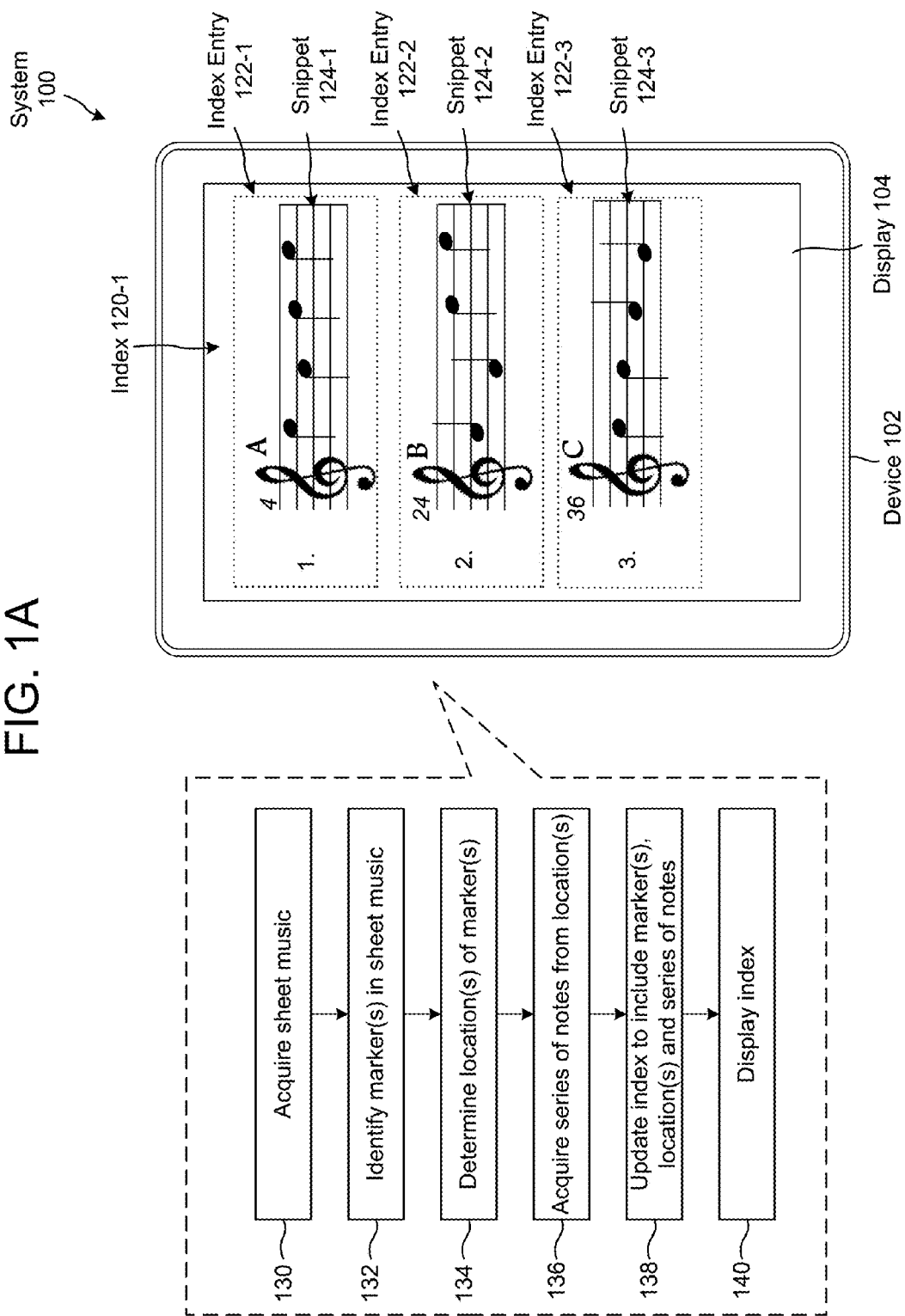

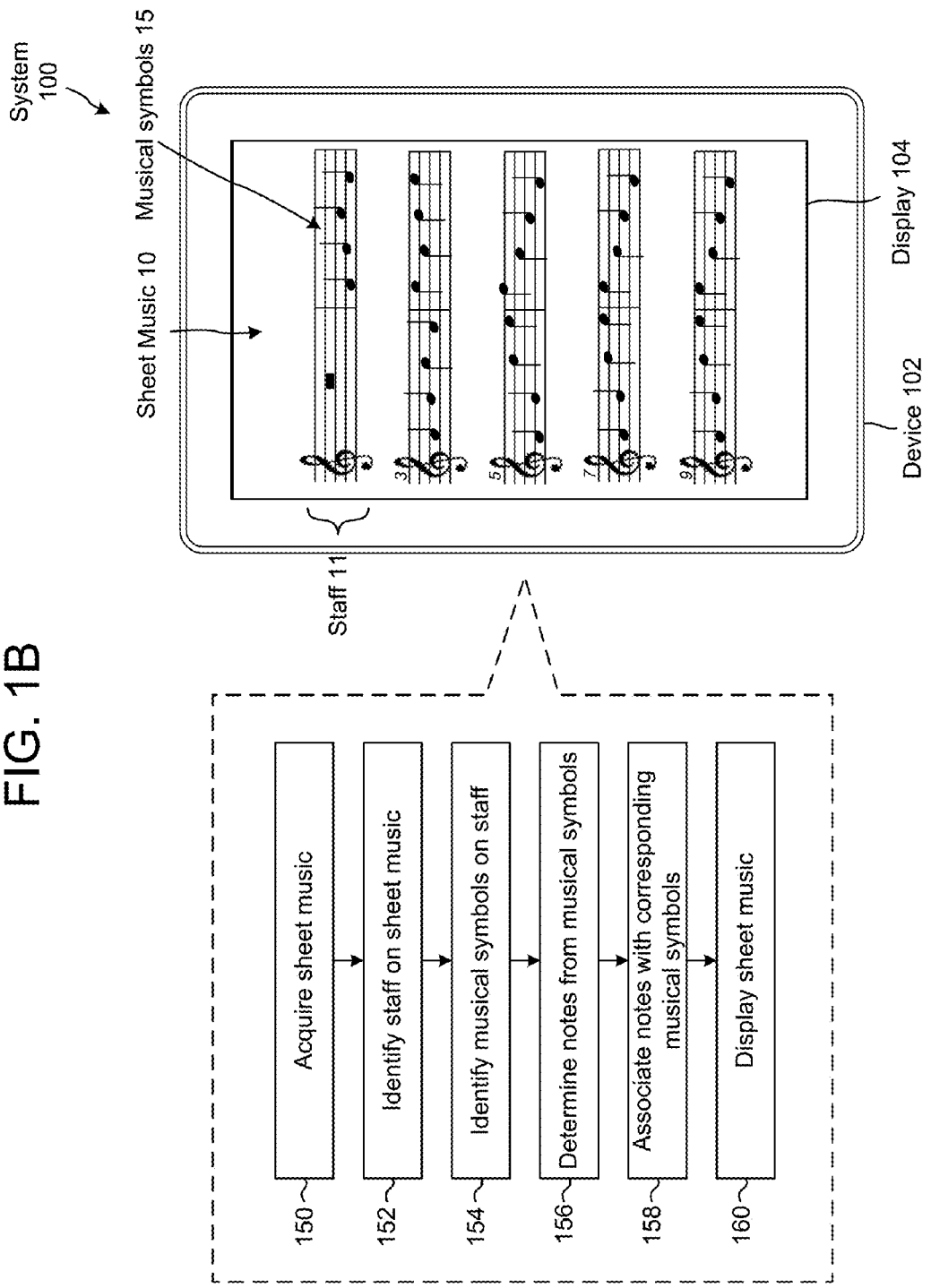

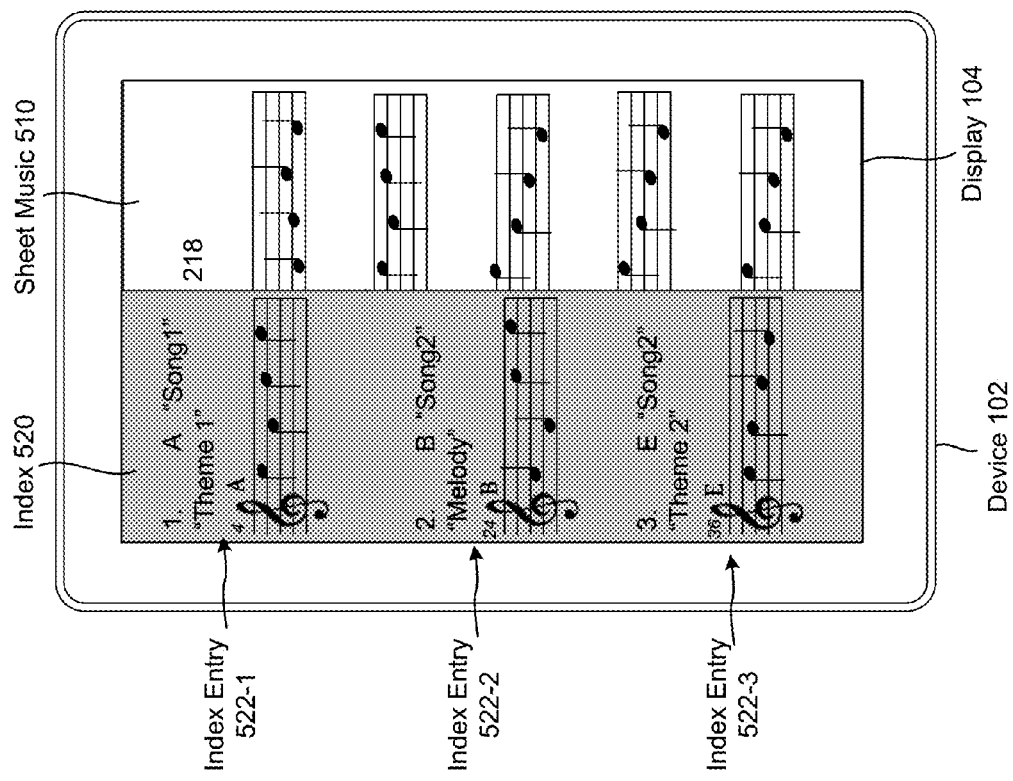

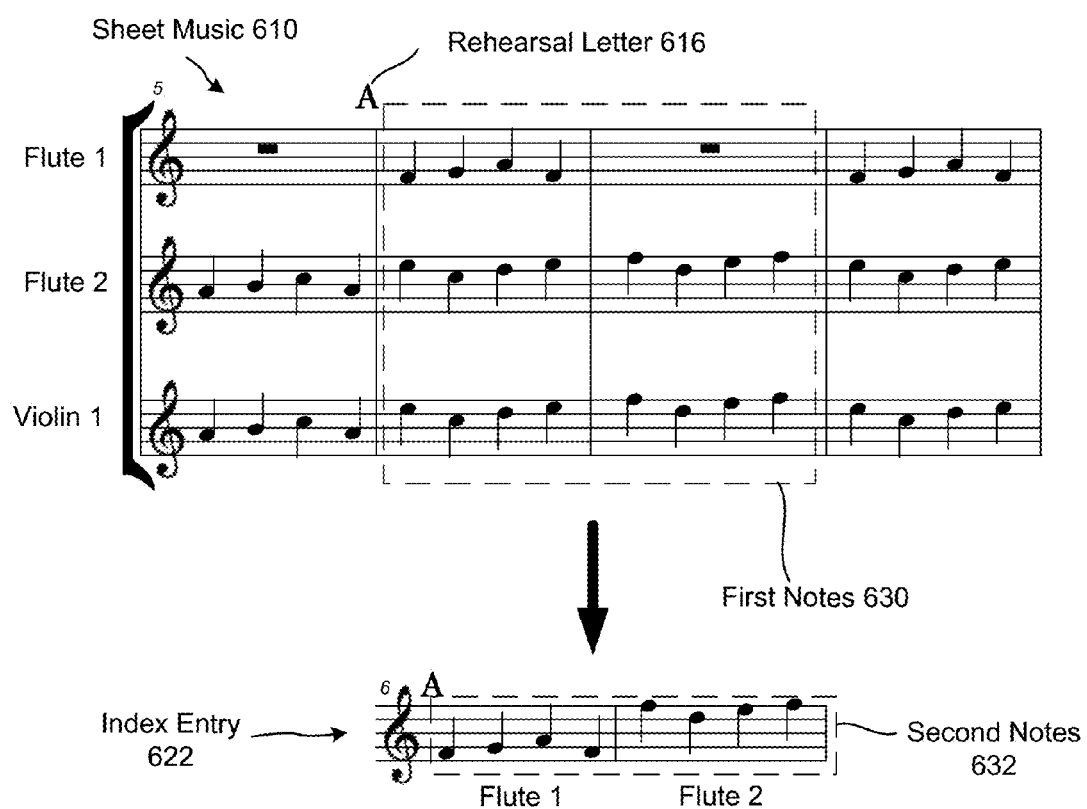

FIG. 11
Sheet Music 1110
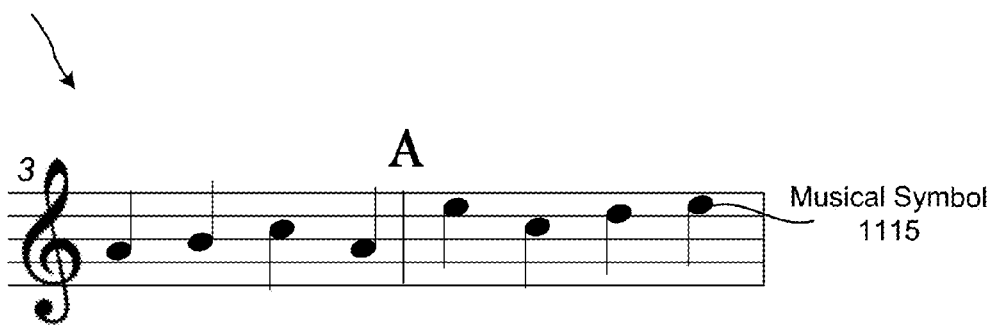
Electronic Music 1130
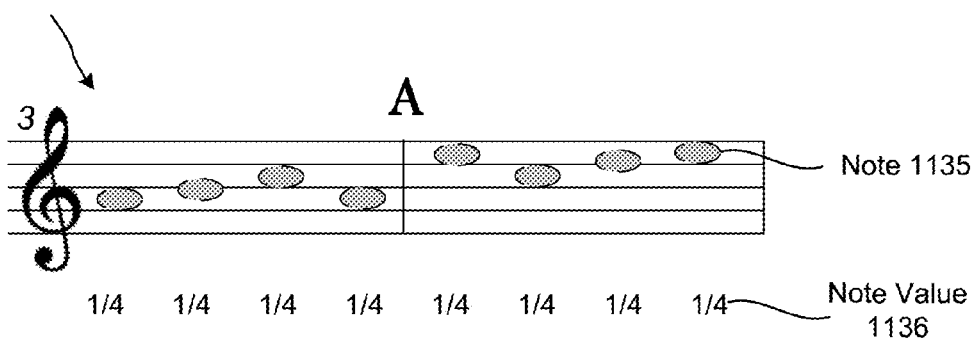

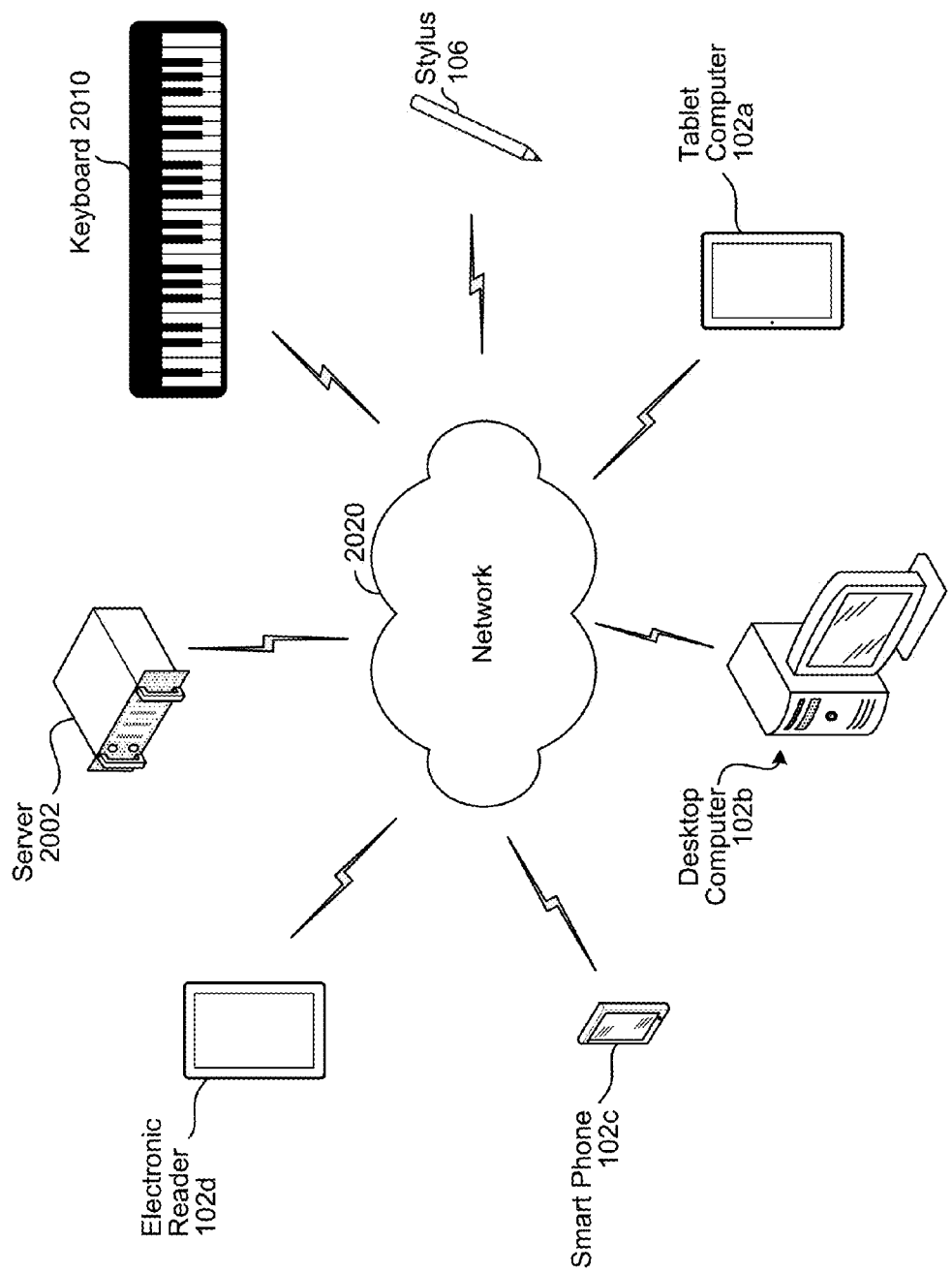

NAVIGATING MUSIC USING AN INDEX INCLUDING MUSICAL SYMBOLS

BACKGROUND

With the advancement of technology, the use and popularity of electronic devices, such as mobile devices, has increased considerably. Mobile devices, such as smart phones and tablet computers, typically have touchscreens that enable a user to operate the devices by touching the screen with a finger or stylus type device.

BRIEF DESCRIPTION OF DRAWINGS

For a more complete understanding of the present disclosure, reference is now made to the following description taken in conjunction with the accompanying drawings.

FIGS. 1A-1B illustrate overviews of systems for implementing embodiments of the present disclosure.

FIG. 5 illustrates an example of a user interface displaying sheet music and an index of markers according to embodiments of the present disclosure.

FIG. 6 illustrates an example of sheet music including multiple instruments being displayed using a single series of notes according to embodiments of the present disclosure.

FIG. 11 illustrates an example of sheet music and corresponding electronic music according to embodiments of the present disclosure.

FIG. 20 is a block diagram conceptually illustrating an example of a computer network for use with the present system.

DETAILED DESCRIPTION

Figure 2B:
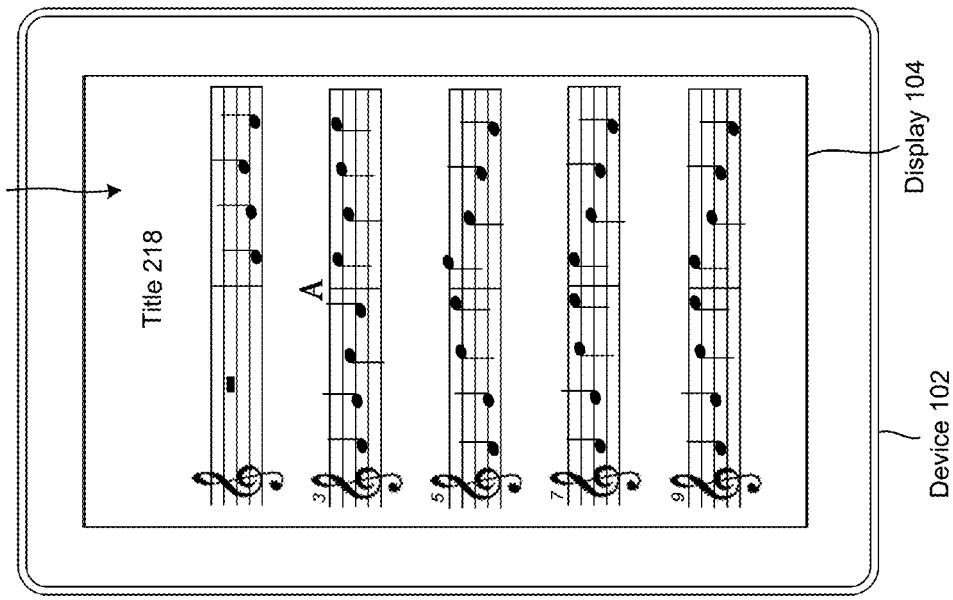
FIGS. 2A-2C illustrate sheet music and a user interface showing sheet music.

A computing device, such as a computer, tablet, smartphone, electronic reader, etc., may be used to display electronic books, newspapers, magazines, blogs and other digital media or electronic publications, including sheet music. For a text based publication, navigation may be improved by a table of contents or an index that links to particular sections within the publication. A device may generate a table of contents or index based on formatting inherent in the text based publication, such as chapters, sections and headings, and text may easily identify the particular section being referenced. Sheet music, however, is not text based and typically does not include formatting to easily allow the device to generate a table of contents or index. In addition, it may be difficult to identify a particular section of the sheet music being referenced using text. Further, sheet music is typically displayed using a fixed layout, such as a Portable Document Format (PDF) or an image of printed sheet music. As the sheet music has a fixed layout, a size of the sheet music is fixed based on the fixed layout. Thus, if the device magnifies a view of the sheet music, portions of the sheet music may be outside a display of the device.

In order to provide a more complete set of features, provided is a system for improved navigation, magnified display and additional functionality associated with sheet music. To improve navigation, the device may identify markers in sheet music and generate an index displaying the markers, marker locations and musical symbols associated with the markers. Using the musical symbols, it may be easier to identify a particular section being referenced by the index. The index may also allow improved navigation functionality, such as enabling a user to select a marker and displaying the sheet music at a location associated with the marker. To enable a magnified display, the device may identify musical symbols displayed in the sheet music and acquire electronic musical symbols corresponding to the displayed musical symbols. The device may use the electronic musical symbols to display electronic sheet music that can be magnified and displayed in sequence by reflowing the electronic musical symbols between pages. The electronic musical symbols may also enable improved functionality, as the electronic musical symbols may be used to modify musical symbols in the sheet music, to generate and output audio corresponding to the sheet music and to monitor an audio input from a microphone and display a current location in the sheet music determined from the audio input.

As described herein, "sheet music" may refer to sheet music data, which is an electronic representation of sheet music that the device may visually represent on the display using a fixed layout, whereas "electronic sheet music" may refer to electronic sheet music data, which is an electronic representation of electronic sheet music that the device may visually represent on the display using a variety of layouts based on a zoom magnification or other settings. For example, the electronic sheet music data may include a series or sequence of electronic musical symbols and the device may visually represent the series of electronic musical symbols as first electronic sheet music using a first magnification and as second electronic sheet music using a second magnification, the series of electronic musical symbols reflowed in the second electronic sheet music so that the series of electronic musical symbols are displayed in order using additional pages relative to the first electronic sheet music. Similarly, "musical symbols" may refer to musical symbols included in the fixed layout sheet music, whereas electronic musical symbols may refer to musical symbols visually represented in the electronic sheet music that also include associated data, such as a pitch (note) and duration (note value) indicated by the electronic musical symbols. For example, musical symbols may be an image or visual representation of the musical symbols included in the sheet music and the device may display the musical symbols. In contrast, electronic musical symbols may include a visual representation of the electronic musical symbol to display, along with a pitch (note) and duration (note value) indicated by the electronic musical symbol. Therefore, the device may display the electronic musical symbol, generate audio based on the electronic musical symbol or search the electronic musical symbol based on a series of pitches.

Content (e.g., electronic documents, sheet music, electronic sheet music or the like) may be stored using a variety of file formats, and some of the file formats may use markup languages such as Extensible Markup Language (XML). For example, data including sheet music may be stored in fixed layout file formats, such as image files or Portable Document Format (PDF) files, while electronic sheet music data may be stored in music notation file formats, such as MusicXML files, or the electronic musical symbols may be saved as a sequence of commands, for example using a Musical Instrument Digital Interface (MIDI) protocol to generate a Standard MIDI File (SMF). The device may interpret electronic sheet music data, such as a MusicXML file or a SMF, and visually represent the electronic musical symbols on a display of the device as the electronic sheet music. In some examples, the MusicXML and/or SMF may be associated with sheet music, such as a PDF, but may be stored separately from the sheet music.

A single file may include sheet music and/or electronic sheet music associated with a single song or multiple songs. For example, a first file may include sheet music and/or electronic sheet music associated with a first song, while a second file may include sheet music and/or electronic sheet music associated with a second song and a third song. In addition, a single file may include sheet music and/or electronic sheet music for a single instrument or multiple instruments. For example, the first file may only include sheet music and/or electronic sheet music for a violin, while the second file may include sheet music and/or electronic sheet music for both a violin and a cello. Therefore, one file may include multiple songs for multiple instruments (e.g., set list for an entire orchestra), multiple songs for a single instrument (e.g., set list for a violin in the orchestra), a single song for multiple instruments (e.g., single song for the entire orchestra) or a single song for a single instrument (e.g., single song for the violin).

A table of contents or an index (hereinafter, both a table of contents and an index may be referred to as an "index" for ease of explanation) may be used to navigate between multiple files and/or multiple songs within a file. The index may include multiple levels, such as a first-level header (e.g., heading) and a second-level header (e.g., subheading), and a user may add or delete index entries to the index. The index may be stored separately from the sheet music and/or the electronic sheet music using a format such as a Navigation Control file for XML applications (NCX). A single index may reference locations within multiple files, such as multiple Music XML, SMF and/or PDF documents. Therefore, the NCX may allow a user of the device to navigate between sheet music and/or electronic sheet music associated with multiple songs to reference locations in the multiple songs indicated by index entries in the index.

FIG. 1A illustrates an overview of a system 100 for implementing embodiments of the present disclosure. The system 100 includes a computing device 102 having a display touchscreen 104. The touchscreen 104 is a display capable of receiving input via contact between an object (such as a finger, stylus, etc.) and the screen. As part of the operation, the computing device 102 displays a user interface (UI), which may display sheet music. The sheet music may be static, such as image(s) of sheet music, or may be dynamic, such as electronic notes displayed as electronic sheet music that is operable by different functions, for example to play the electronic sheet music to convert the electronic sheet music to audible music. Static sheet music may be displayed at various zoom magnifications, but the image(s) of the sheet music is fixed and therefore the sheet music cannot be adjusted based on the zoom magnification. In contrast, dynamic sheet music may be displayed at various zoom magnifications and the sheet music may be adjusted based on the zoom magnification, such that individual measures and notes may be shifted from page to page based on the zoom magnification. Thus, a location of the individual measures may change based on the zoom magnification.

To assist in organizing and accessing the sheet music, the device 102 may generate and display an index 120 associated with the sheet music. The index 120 may include index entries referencing different measures within the sheet music. The index entries may each be associated with a marker, such as rehearsal letter A, rehearsal letter B and rehearsal letter C, which refer to the respective measures within the sheet music. For example, the first index entry 122-1 may reference rehearsal letter A in measure 4, the second index entry 122-2 may reference rehearsal letter B in measure 24, and the third index entry 122-3 may reference rehearsal letter C in measure 36. The index entries may include snippets of music, such as a sequence of musical notes, associated with the respective marker. The snippets of music may be musically representative of respective sections of the sheet music, such as a series of notes in the sheet music associated with the respective marker. For example, the first index entry 122-1 includes a first snippet 124-1, the second index entry 122-2 includes a second snippet 124-2 and the third index entry 122-3 includes a third snippet 124-3. Thus, the index 120 may provide both a list of markers and associated information, a location in the sheet music and some musical notes from the location in the sheet music. Each index entry may also be associated with an index reference, for example, numbers "1.", "2.", or "3.", of the index entries.

Examples of markers may include rehearsal letters or numbers, a beginning of a particular section within the music, a beginning of a movement or theme, a beginning of a new piece of music, a bookmark saved by a user or other points of reference within the sheet music. The markers may be visible in the sheet music and/or electronic sheet music, although some markers may not be visually indicated. The markers may be associated with marker data (e.g., rehearsal letter data, rehearsal number data, section data, bookmark data or the like) embedded in or associated with the sheet music data and/or the electronic sheet music data. For example, some marker data may indicate a type of marker and the device may determine a location of the marker based on a location of the marker data. Other marker data may indicate a type of marker and include a reference location associated with the marker. Some marker data may be semantic elements included in the sheet music data and/or electronic sheet music data. For example, the device 102 may identify a first semantic element (e.g., a first type of tag) and associate first semantic elements with a particular type of marker.

To generate the index 120, the device 102 may acquire (130) sheet music, such as by accessing electronic sheet music data or file(s)/document(s)/image(s) including sheet music. The device 102 may identify (132) marker(s) in the sheet music and may determine (134) location(s) of the marker(s) in the sheet music. For example, the device 102 may identify markers or other notations in the sheet music, or metadata associated with the sheet music, specifying specific regions as important. For example, in the sheet music the device 102 may identify rehearsal letters or numbers based on a position of the text relative to a staff in the sheet music, a beginning of a movement or theme based on notations or annotations, a beginning of a section based on a double bar line and/or a beginning of a new piece of music based on a bold double bar line. In addition, the device 102 may identify markers based on metadata associated with the sheet music, the metadata including the markers listed above along with annotations or bookmarks saved by a user. Thus, the sheet music may include a first rehearsal letter in the published sheet music and a second rehearsal letter added by the user that is saved in the metadata.

The device 102 may acquire (136) a series of notes from location(s) associated with marker(s). For example, the device 102 may acquire image(s) of the series of notes, may obtain the series of notes directly from electronic sheet music or may convert image(s) of sheet music into the series of notes. The device 102 may update (138) an index to include marker(s), location(s) and series of notes associated with marker(s). For example, the device 102 may save the information related to the marker(s) to an electronic file separate from the sheet music. The device 102 may display (140) the index, including the series of notes associated with the markers. In some embodiments, the device 102 may display the index individually, whereas in other embodiments the device 102 may display the sheet music and the index simultaneously. In addition, various elements of the index may be displayed, and user preferences may be used to filter markers or modify what information associated with the markers is displayed.

FIG. 1B illustrates an overview of a system for implementing embodiments of the present disclosure. As illustrated in FIG. 1B, the device 102 may convert image(s) of sheet music into electronic sheet music, such as by generating a series of notes associated with the sheet music. As illustrated in FIG. 1B, the sheet music 10 may include a staff 11 and musical symbols 15 positioned on the staff 11 indicating a pitch and duration of notes.

To generate the electronic sheet music, the device 102 may acquire (150) sheet music, such as by accessing file(s)/document(s)/image(s) of sheet music. The device 102 may identify (152) a staff on the sheet music, the staff being a typical musical notation encompassing five evenly spaced lines. The device 102 may identify (154) musical symbols on the staff, determine (156) notes from the musical symbols and associate (158) notes with the corresponding musical symbols. For example, the device 102 may analyze a musical symbol to identify a note (pitch) and a note value (duration) associated with the musical symbol and may save the note and note value as an electronic symbol. Thus, the electronic symbol may include the note and the note value along with a visual representation of the electronic symbol, allowing the device 102 to generate audio using the electronic symbol.

The device 102 may display (160) sheet music, such as the original image(s) of sheet music or electronic sheet music generated from the musical symbols. By generating the electronic sheet music, the device 102 may provide additional functionality when viewing the sheet music. For example, the device 102 may play audio based on the sheet music or may modify individual musical symbols based on a user input.

Figure 2A:
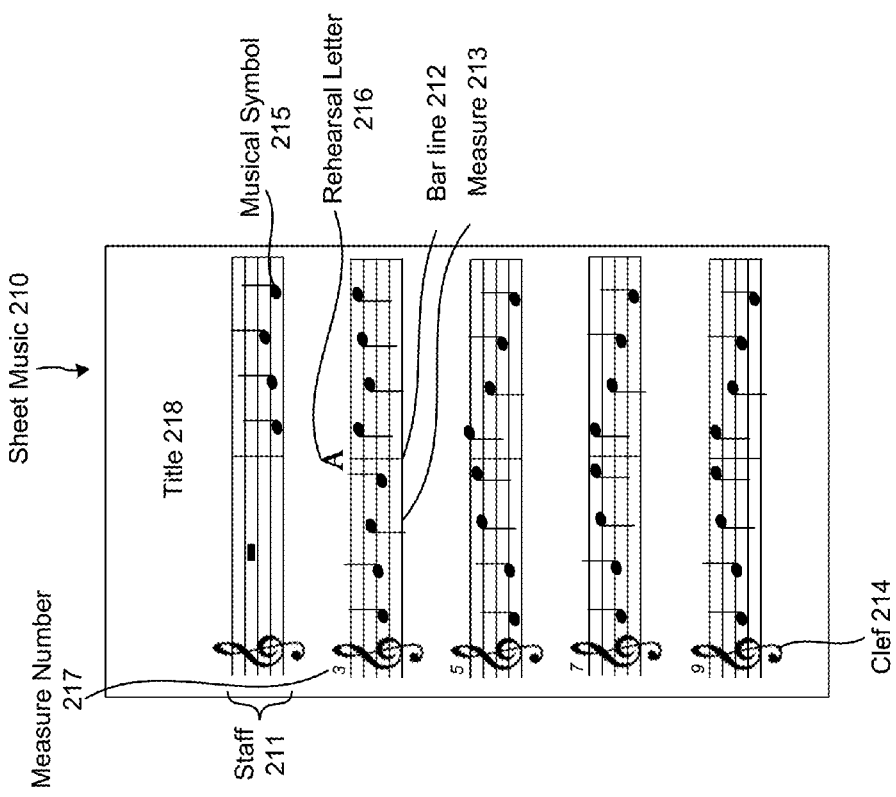
Figure 2C:
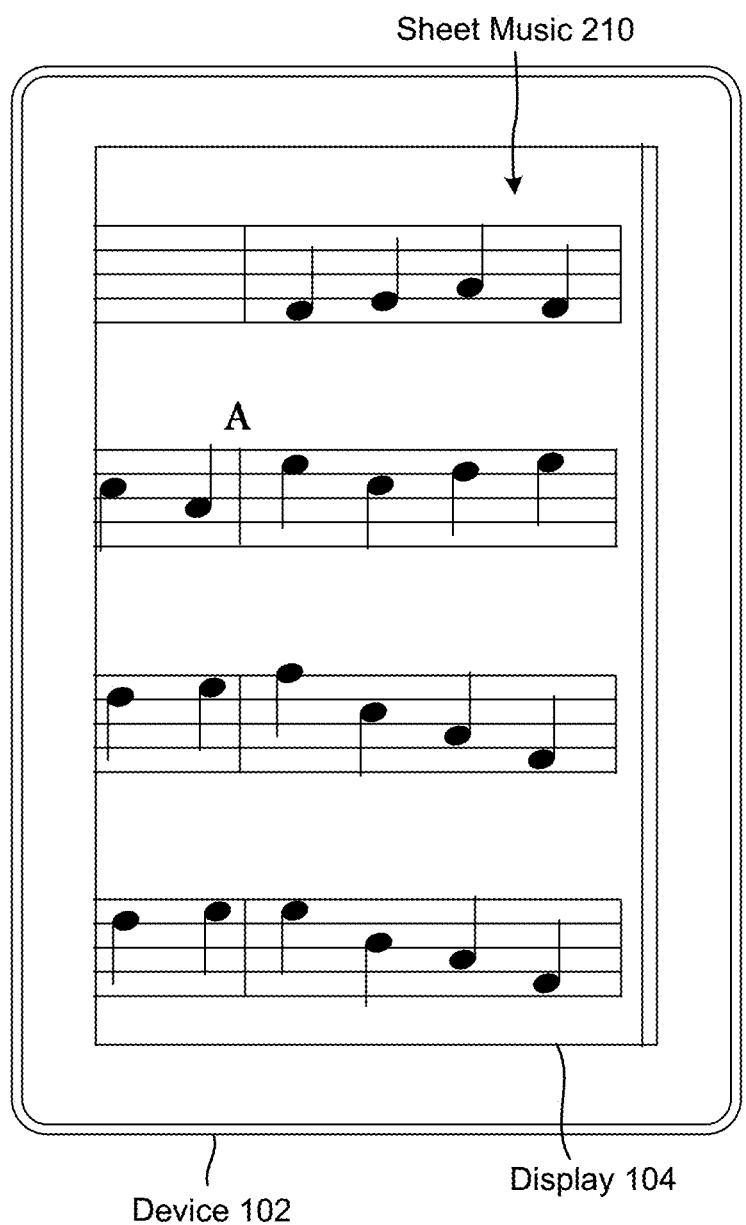

FIGS. 2A-2C illustrate sheet music 210 and a user interface showing the sheet music 210. As illustrated in FIG. 2A, the sheet music 210 may include staves, such as staff 211. As illustrated the sheet music 210 is comprised of 5 evenly spaced staff lines, and the staves may be divided into measures, such as measure 213, by bar lines such as bar line 212. The staves may include clefs, such as clef 214, indicating a pitch range of the staves. The staves may include musical symbols, such as musical symbol 215, indicating a pitch (note) and duration (note value) of the music.

As an example of a marker, rehearsal letter 216 may be used to identify a particular section of the sheet music 210. To identify locations within the sheet music, measure numbers, such as measure number 217, may indicate a number for a particular measure. Thus, the rehearsal letter 216 may have a location of 4, indicating it begins at the fourth measure number in the sheet music 210 of Title 218.

FIG. 2B illustrates a user interface displaying an image of the sheet music 210. As the device 102 is displaying an image, when the sheet music 210 is enlarged, as illustrated in FIG. 2C, individual elements of the sheet music 210 may be enlarged but the sheet music 210 may not be reformatted to fit the display 104. Thus, a user may encounter difficulty playing music with an enlarged view of the sheet music.

Figure 3:
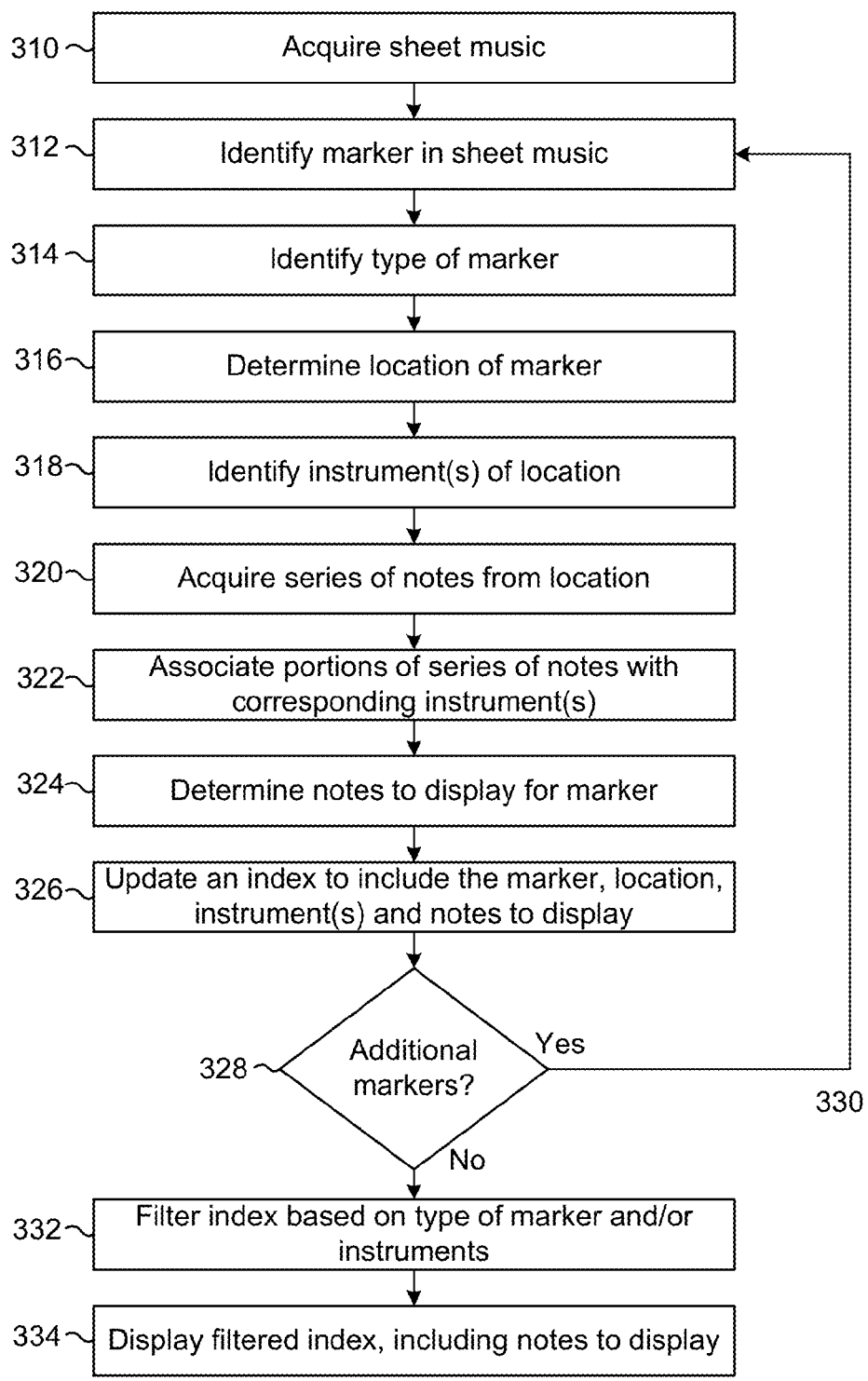
FIG. 3 is a flowchart conceptually illustrating generating an index of markers according to embodiments of the present disclosure.

FIG. 3 is a flowchart conceptually illustrating generating an index of markers for sheet music according to embodiments of the present disclosure. As illustrated in FIG. 3, the device 102 may acquire (310) sheet music, such as by accessing electronic sheet music data or file(s)/document(s)/image(s) including sheet music.

The device 102 may identify (312) a marker in the sheet music, such as by identifying a notation in the sheet music corresponding to a marker or by identifying an electronic marker associated with the sheet music. For example, in the sheet music the device 102 may identify rehearsal letters or numbers based on a position of the text relative to a staff in the sheet music, a beginning of a movement or theme based on notations or annotations, a beginning of a section based on a double bar line and/or a beginning of a new piece of music based on a bold double bar line. In addition, the device 102 may identify markers based on metadata associated with the sheet music, the metadata including the markers listed above along with annotations or bookmarks saved by a user. Thus, the sheet music may include a first rehearsal letter in the published sheet music and a second rehearsal letter added by the user that is saved in the metadata.

The device 102 may identify (314) a type of marker for the marker. Examples of markers types may include rehearsal letters or numbers, a particular section of the music, a beginning of a movement or theme, a beginning of a new piece of music, a bookmark saved by a user or other points of reference within the sheet music.

The device 102 may determine (316) a location of the marker based on a staff, measure number, bar line, or the like, associated with the marker. For example, the device 102 may identify a staff associated with the marker, may identify a measure number located at the beginning of the staff and determine a number of bar lines between the measure number and the marker.

The device 102 may identify (318) instrument(s) associated with the location. For example, a marker may be associated with a system that includes multiple staves. Individual staves may be associated with an individual instrument, although some instruments may be associated with multiple staves, such as a piano being associated with a grand staff (including a staff for a treble clef and a staff for a bass clef). The sheet music may identify the instrument(s) in notation(s) preceding the staves.

The device 102 may acquire (320) a series of notes from the location. For example, the device 102 may identify musical symbols beginning at the measure number associated with the marker and may determine a pitch (note) and duration (note value) (collectively, "notes") for individual musical symbols. The device 102 may acquire a desired number of musical symbols, a desired number of measures or a desired duration of time associated with the musical symbols.

The device 102 may associate (322) portions of the series of notes with corresponding instrument(s). For example, the notes on a first staff may be associated with a flute while the notes on a second staff may be associated with a clarinet. The device 102 may determine (324) notes to display for the corresponding marker. For example, if a single instrument is identified, the device 102 may display the series of notes for the marker. In contrast, if multiple instruments are identified, the device 102 may display notes associated with a single instrument for the marker, based on user preference, or may display notes associated with multiple instruments. In one example, the device 102 may display notes associated with a flute for a first measure but the flute may have a rest for a second measure and the device 102 may display notes associated with a clarinet for the second measure. In another example, the device 102 may determine that a melody is associated with the flute in a first measure and with a clarinet in a second measure and may display notes associated with the flute for the first measure and notes associated with the clarinet for the second measure. In another example, the device 102 may display notes from multiple instruments on a single staff to display additional information.

The device 102 may update (326) an index to include the marker, location, instrument(s) and notes to display. For example, the device 102 may save the information to an electronic file separate from the sheet music. The device 102 may determine (328) if additional markers are present in the sheet music. If an additional marker is present, the device 102 may loop (330) to step 312 and repeat steps 312-326 for the additional marker.

If an additional marker is not present, the device may filter (332) the index based on a type of marker and/or instruments and may display (334) the filtered index, including notes to display associated with the markers. For example, the index may be filtered to show a rehearsal letter associated with a flute, allowing a flutist to easily navigate the sheet music using the notes associated with the rehearsal letters. While the filtering is illustrated based on a type of marker and/or instruments, the disclosure is not limited thereto. Instead, the device 102 may filter based on a melody, a harmony, a theme, a range of measures in the sheet music or any other filtering system known to one of skill in the art.

Figure 4A:
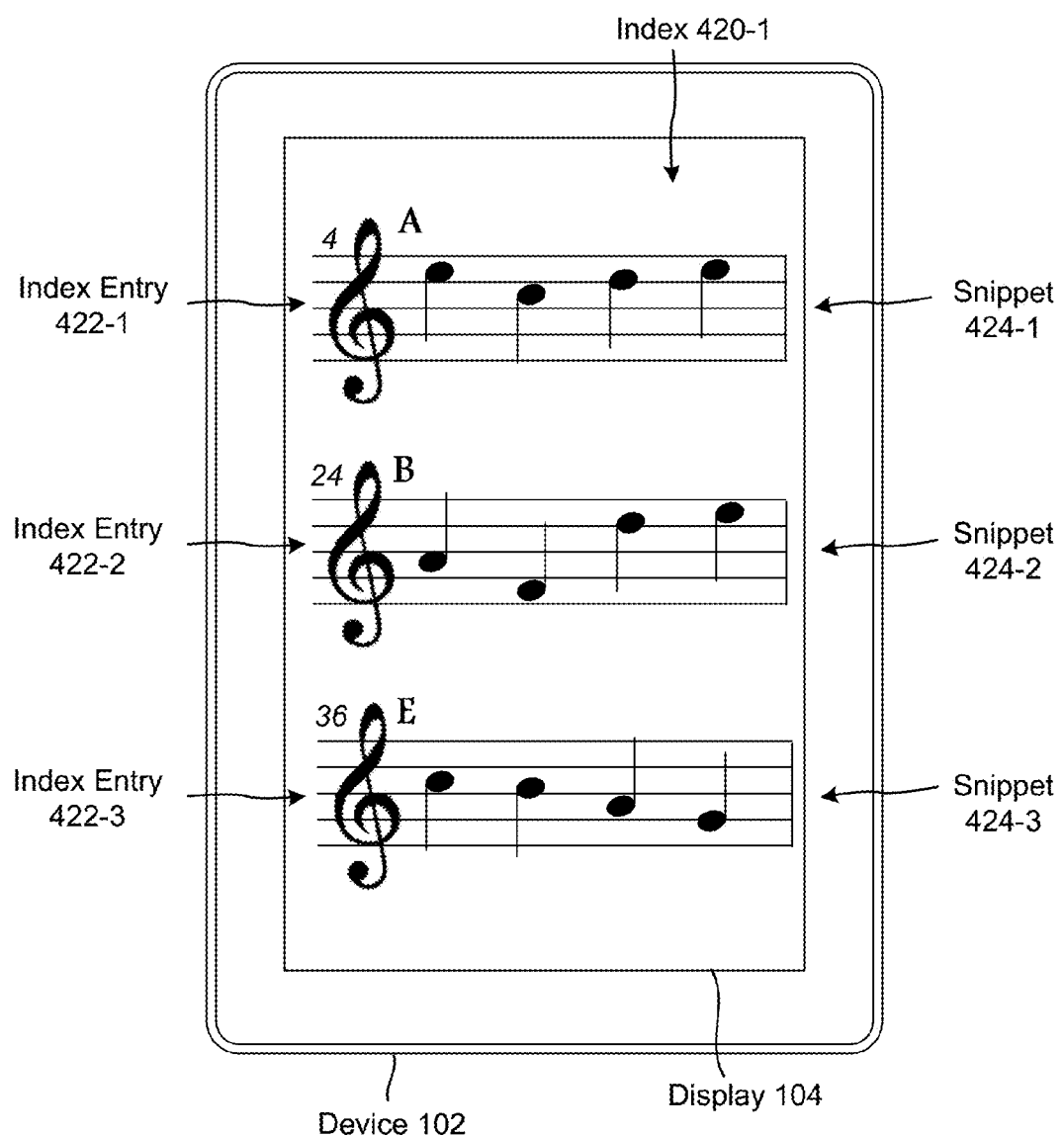
FIGS. 4A-4B illustrate examples of user interfaces displaying indexes of markers according to embodiments of the present disclosure.
Figure 4B:
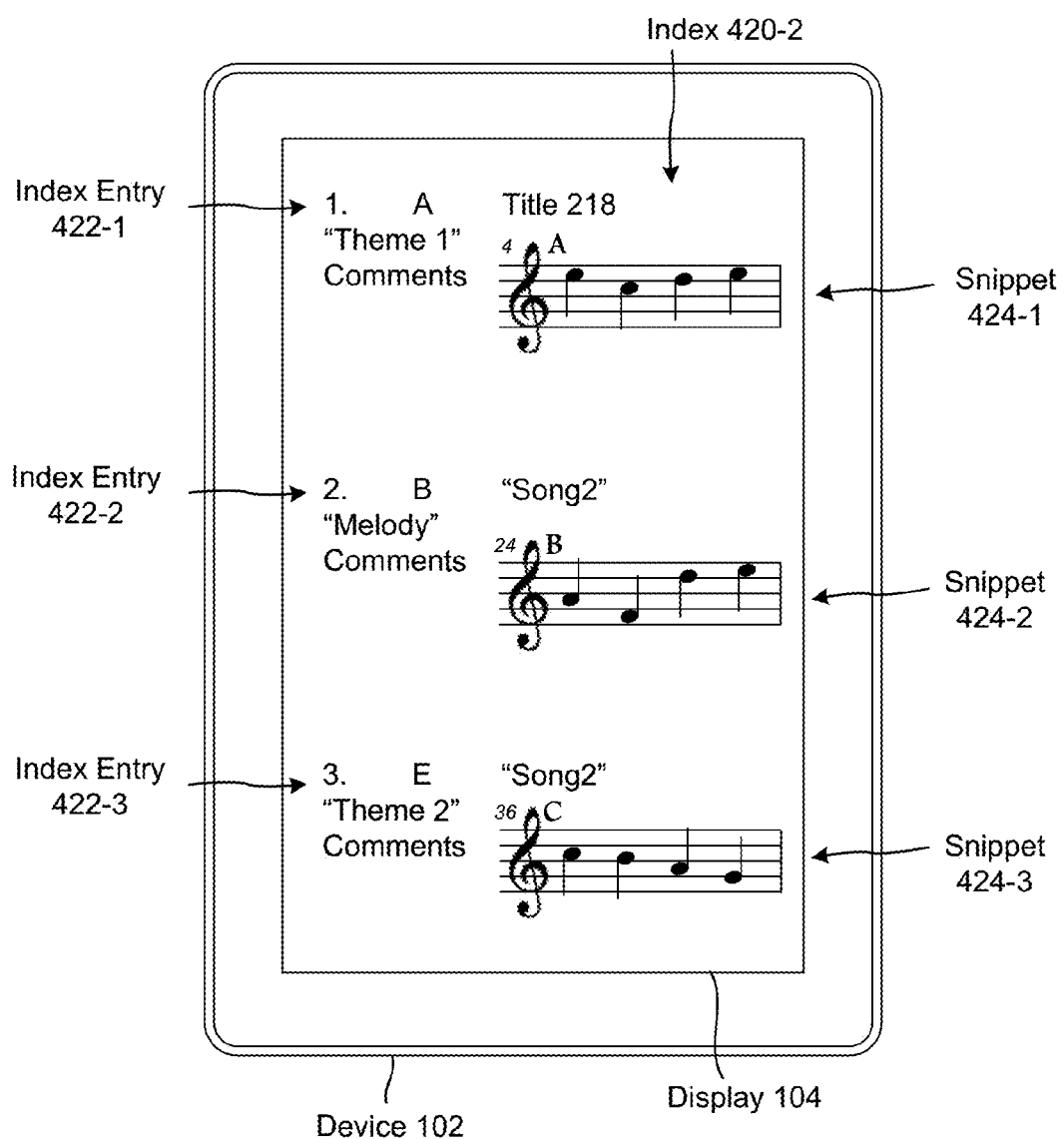

FIGS. 4A and 4B illustrate examples of user interfaces displaying indexes of markers according to embodiments of the present disclosure. FIG. 4A illustrates an example of an index 420-1 occupying an entire screen of the device 102 and prioritizing displaying the notes associated with the markers. For example, first index entry 422-1 includes a rehearsal letter ("A") and a measure number ("4") and a snippet 424-1 of notes associated with the first index entry 422-1. Similarly, second index entry 422-2 includes a rehearsal letter ("B") and a measure number ("24") and a snippet 424-2 of notes associated with the second index entry 422-2. Third index entry 422-3 includes a rehearsal letter ("E") and a measure number ("36") and a snippet 424-3 of notes associated with the third index entry 422-3.

FIG. 4B illustrates an example of an index 420-2 occupying approximately an entire screen of the device 102 and displaying additional information along with the rehearsal letter, the measure number and the notes associated with the marker. As illustrated in FIG. 4B, the index 420-2 includes a numbered list of markers organizing the first index entry 422-1, the second index entry 422-2 and the third index entry 422-3. The first index entry 422-1 includes the rehearsal letter ("A"), a title associated with the song ("Title 218"), a description of the marker ("Theme 1"), additional comments and the snippet 424-1. The second index entry 422-2 includes the rehearsal letter ("B"), a title associated with the song ("Song2"), a description of the marker ("Melody"), additional comments and the snippet 424-2. The third index entry 422-3 includes the rehearsal letter ("E"), a title associated with the song ("Song2"), a description of the marker ("Theme 2"), additional comments and the snippet 424-3. The present disclosure is not limited thereto and the index may include additional information not illustrated in FIG. 4B. For example, if an index entry 422 is selected, the index entry 422 may expand to show additional measures of music or additional instruments associated with the marker. FIG. 5 illustrates an example of a user interface displaying sheet music and an index of markers according to embodiments of the present disclosure. While a user is viewing sheet music 510, as illustrated on the left, the user may open index 520, which may be displayed over a portion of the sheet music 510. The index 520 may be displayed as part of a sliding panel that may be activated and pulled onto the display, or through some other user interface (UI) mechanism. The index 520 may include first index entry 522-1, second index entry 522-2 and third index entry 522-3, along with additional information as described above with regard to FIGS. 4A-4B. A size of the index 520 may vary and the disclosure is not limited thereto.

FIG. 6 illustrates an example of sheet music including multiple instruments being displayed using a single series of notes according to embodiments of the present disclosure. For example, sheet music 610 includes a system having notes associated with Flute 1, Flute 2 and Violin 1. As illustrated in FIG. 6, first notes 630 included in the sixth and seventh measures are associated with rehearsal letter 616 and the device 102 determines second notes 632 to display with an index entry 622 corresponding to the rehearsal letter 616 in an index. In this example, Flute 1 has a rest for the seventh measure, so the device 102 displays notes associated with Flute 1 for the sixth measure and notes associated with Flute 2 for the seventh measure. In another example, the device 102 may determine that a melody is associated with Flute 1 in the sixth measure and with Violin 1 in the seventh measure and may display notes associated with Flute 1 for the sixth measure and notes associated with Violin 1 for the seventh measure. The device 102 may determine a melody based on the sheet music 610, such as based on an order of instruments in the system, or the device 102 may determine a melody based on additional information or metadata associated with the sheet music 610. While FIG. 6 illustrates the second notes 632 including first notes 630 associated with a single instrument at a time, the disclosure is not limited thereto. Instead, the second notes 632 may combine first notes 630 associated with Flute 1 and Flute 2 on a single staff. For example, first notes 630 associated with Flute 1 and Flute 2 in the sixth measure may be included as second notes 632 in the index entry 622. Notes associated with Flute 1 may be differentiated from notes associated with Flute 2 by color, formatting or the like.

The index may be dynamic and operable, and associated with various functionality executable by the device. For example, FIG. 7A-7B illustrate a flowchart and example of selecting a marker in an index and displaying sheet music based on a location of the marker according to embodiments of the present disclosure.

Figure 7A:
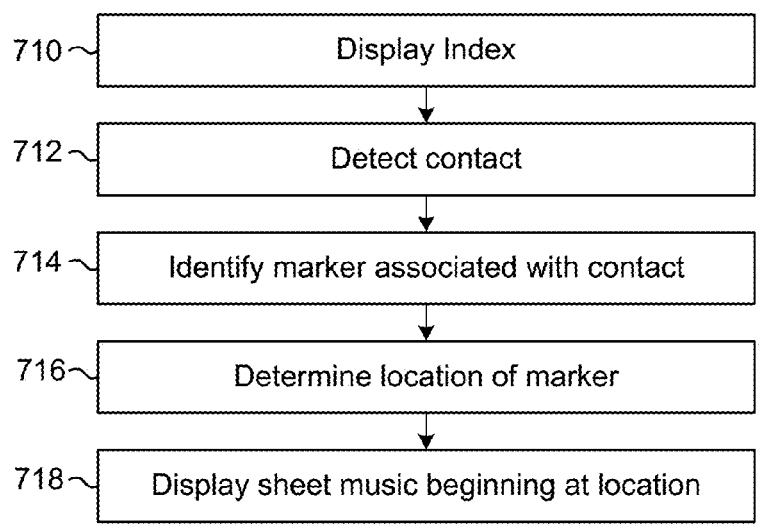
FIG. 7A-7B illustrate a flowchart and example of selecting a marker in an index and displaying sheet music based on a location of the marker according to embodiments of the present disclosure.

As illustrated in FIG. 7A, the device 102 may display (710) an index on the display 104. The device 102 may detect (712) contact on the display 104, such as at first coordinates of the display 104. The device 102 may identify (714) a marker associated with the contact, such as a marker associated with the first coordinates. The device 102 may determine (716) a location of the marker in the sheet music, such as a measure number associated with the marker. The device 102 may then display (718) the sheet music beginning at the location associated with the marker as illustrated in reference to FIG. 7B.

Figure 7B:
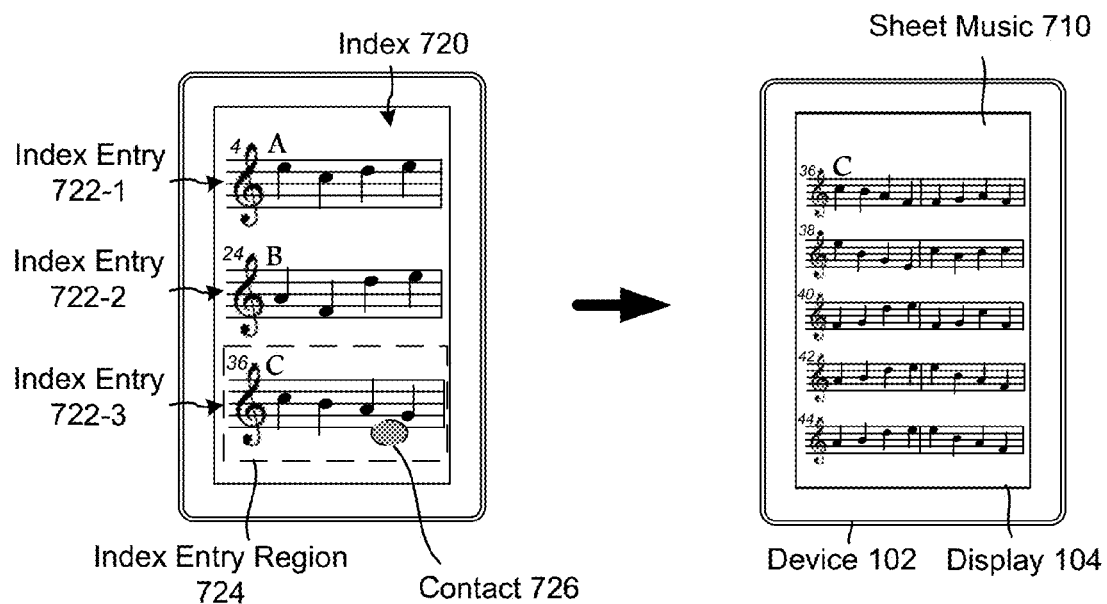

FIG. 7B illustrates an index 720 having first index entry 722-1, second index entry 722-2 and third index entry 722-3. The device 102 may associate a portion of the display (namely index entry region 724) with the third index entry 722-3. If the device 102 detects contact 726 within the index entry region 724, the device 102 may identify the third index entry 722-3 associated with the index entry region 724, may determine a location of the third index entry 722-3 (e.g. measure number 36) and may display the sheet music 710 beginning at the location. However, while FIG. 7B illustrates the location beginning at the top left of the display 104, embodiments may vary and the disclosure is not limited thereto. Instead, the device 102 may display a page of sheet music including the location without departing from the disclosure. For example, if the device 102 is displaying an image of the sheet music 710, measure number 36 may not be located at the top left of a corresponding page and as it is an image of the sheet music 710, the device 102 may not be able to reformat the sheet music 710.

Figure 8:
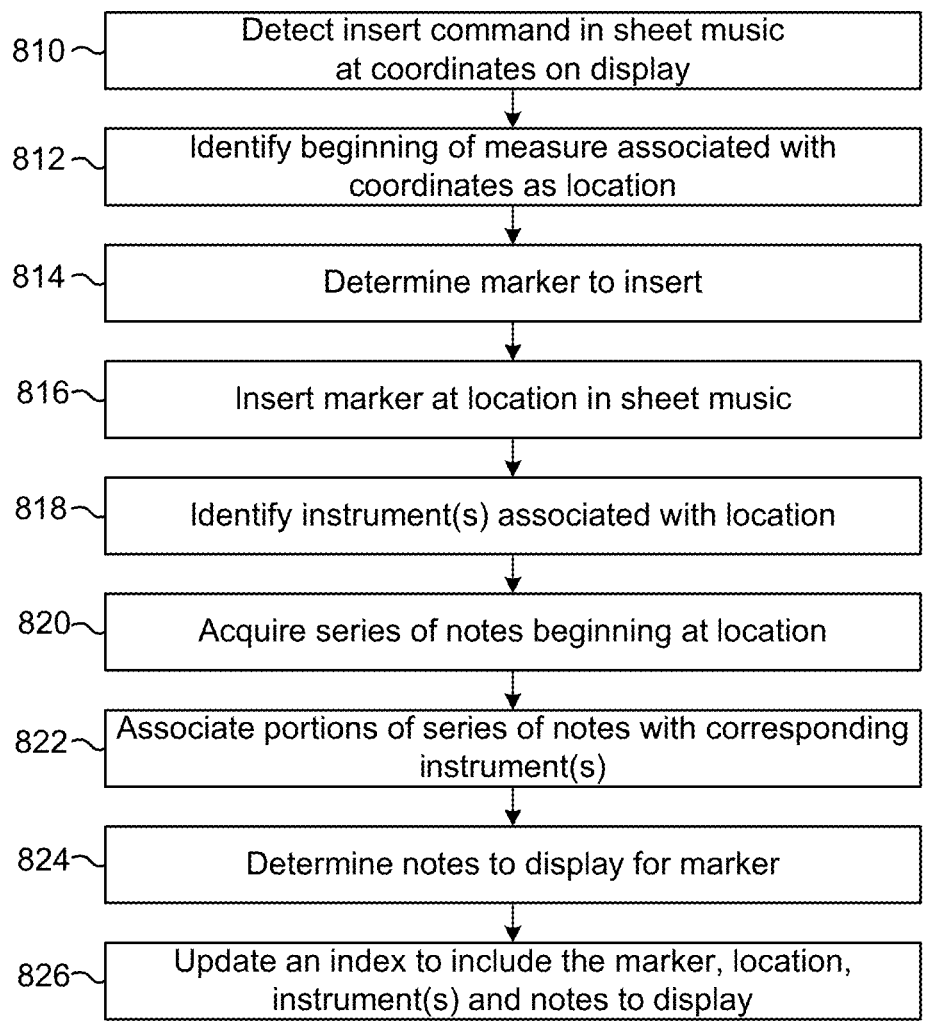
FIG. 8 is a flowchart conceptually illustrating inserting a marker and updating an index to add the marker according to embodiments of the present disclosure.

FIG. 8 is a flowchart conceptually illustrating inserting a marker and updating an index to add the marker according to embodiments of the present disclosure. The device 102 may detect (810) an insert command in sheet music at coordinates on a display 104 and may identify (812) a beginning of a measure associated with coordinates as a location. For example, a user may click on a staff line within a first measure and indicate to the device 102 to insert a marker. In response, the device 102 may detect the insert command at first coordinates, may identify the first measure based on the first coordinates and identify a beginning of the first measure.

The device 102 may determine (814) a marker to insert and may insert (816) the marker at the location in the sheet music. As an example, the device 102 may provide the user with a list of available markers and the user may select a particular marker to insert. As another example, the device 102 may use a particular marker for insert commands and may not need input from the user. The device 102 may insert a visual representation of the marker at a desired location, such as above the bar line preceding the measure, or the device 102 may insert the visual representation of the marker at the first coordinates.

The device 102 may identify (818) instrument(s) associated with the location. For example, the device 102 may determine that the location is associated with a single staff and therefore a single instrument. Alternatively, the device 102 may determine that the location is associated with a system including multiple instruments. The device 102 may acquire (820) a series of notes beginning at the location for the instrument(s) and may associate (822) portions of series of notes with corresponding instrument(s). For example, if a system is present including three instruments, the device 102 may acquire a series of notes for the three instruments and associate portions of the series of notes with the corresponding instrument.

The device 102 may determine (824) notes to display for the marker, such as the notes to display in an index. The device 102 may then update (826) an index to include the marker, location, instrument(s) and notes to display. The disclosure is not limited thereto, and the device 102 may update the index to include additional information not listed.

Figure 9:
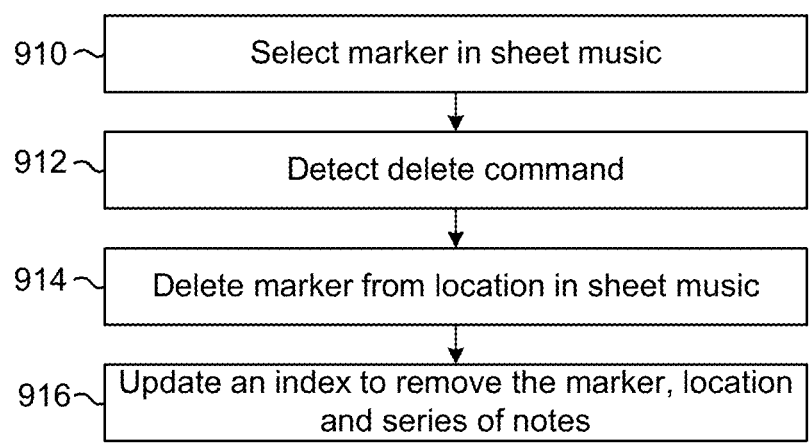
FIG. 9 is a flowchart conceptually illustrating deleting a marker and updating an index to remove the marker according to embodiments of the present disclosure.

FIG. 9 is a flowchart conceptually illustrating deleting a marker and updating an index to remove the marker according to embodiments of the present disclosure. The device 102 may select (910) a marker in sheet music and may detect (912) a delete command. For example, a user may click on a marker and indicate to the device 102 to delete the marker. In response, the device 102 may detect that the marker is selected and detect the delete command. The device 102 may delete (914) the marker from the location in the sheet music. For example, the device 102 may remove a visual representation of the marker from the sheet music, if possible. If the marker is a notation included in an image of the sheet music, the device 102 may leave the marker or add a symbol indicating that the marker is removed from an index. The device 102 may update (916) the index to remove the marker and a location and series of notes associated with the marker. As a first example, a first marker may be an electronic marker added by the user. Upon selecting the first marker and detecting a delete command, the device 102 may remove a visual representation of the first marker from the sheet music and update the index to remove the first marker and associated information. As a second example, a second marker may be a rehearsal letter included in the published sheet music. Upon selecting the second marker and detecting the delete command, the device 102 may update the index to remove the second marker and associated information. Alternatively, the device 102 may add a symbol to the second marker indicating that the second marker is not included in the index and update the index to remove the second marker and associated information. While FIG. 9 illustrates the marker being deleted, the disclosure is not limited thereto. Instead, the index may retain the marker and associated data but not display the marker and associated data. Thus, if the user indicates to the device 102 to display the marker at a later point in time, the device 102 may locate the marker and associated information in the index.

Figure 10:
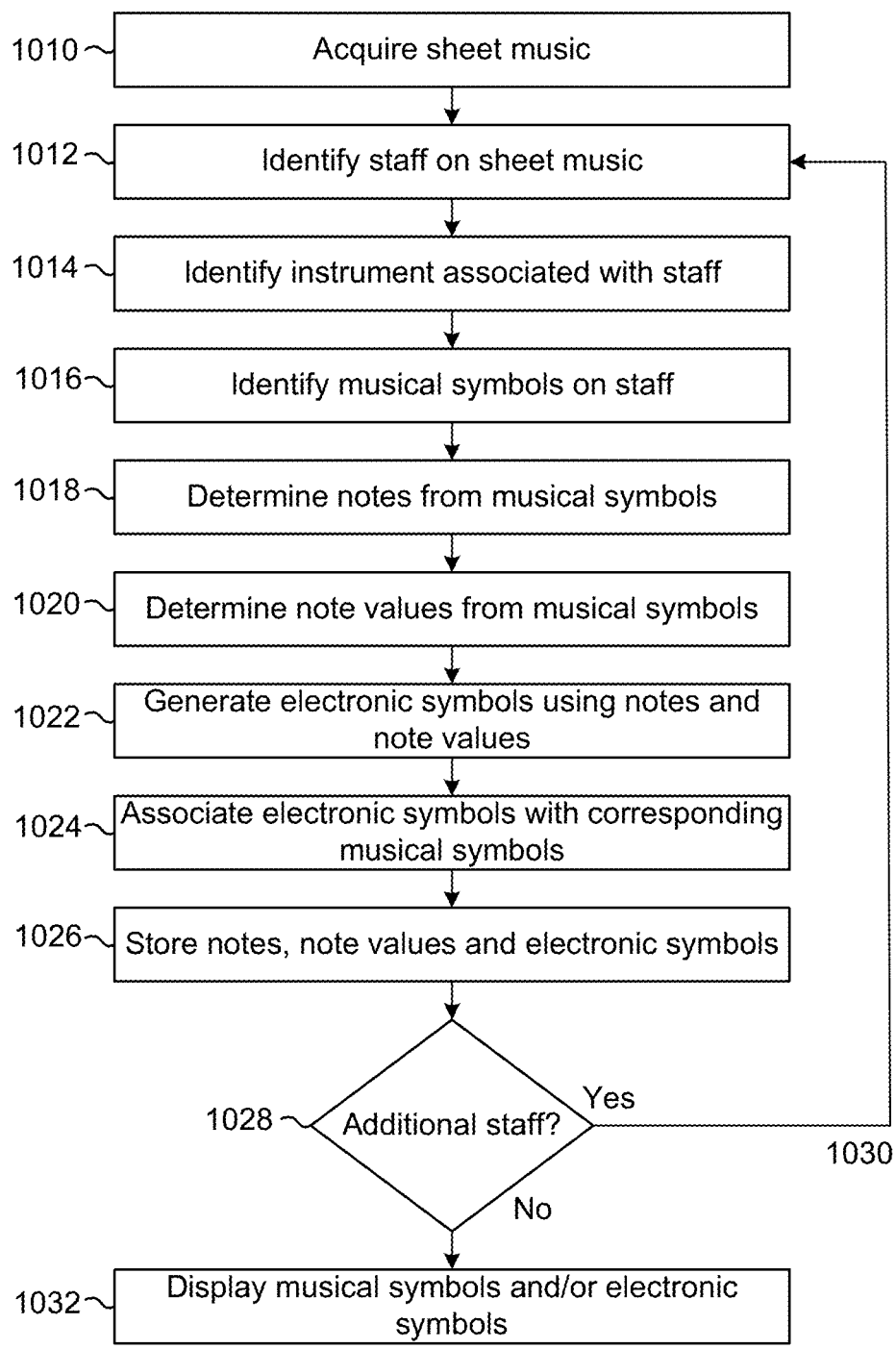
FIG. 10 is a flowchart conceptually illustrating converting musical symbols from sheet music into electronic symbols according to embodiments of the present disclosure.

FIG. 10 is a flowchart conceptually illustrating converting musical symbols from sheet music into electronic symbols according to embodiments of the present disclosure. By converting the sheet music into electronic symbols, the device 102 may provide additional functionality beyond displaying the sheet music. To generate the electronic symbols, the device 102 may acquire (1010) sheet music, such as by accessing file(s)/document(s)/image(s) including sheet music.

The device 102 may identify (1012) a staff on the sheet music, the staff being a typical musical notation encompassing five evenly spaced staff lines. The device 102 may identify (1014) an instrument associated with the staff and identify (1016) musical symbols positioned on the staff. For example, the sheet music may include a system having multiple instruments and may have notations identifying the multiple instruments. The device 102 may determine (1018) notes (pitch) from the musical symbols. For example, the staff may include a clef indicating a pitch range and each musical symbol may be associated with a particular pitch in the pitch range. The device 102 may determine (1020) note values (duration) from the musical symbols. The note values may be a duration of the musical symbol based on a timing system identified in the sheet music. The device 102 may generate (1022) electronic symbols using the notes and the note values and may associate (1024) the electronic symbols with corresponding musical symbols.

The device 102 may store (1026) the notes, the note values and the electronic symbols. For example, the device 102 may store the notes, the note values and the electronic symbols separate from the sheet music, such as in an index, a metadata file or another file associated with the sheet music.

The device 102 may determine (1028) if an additional staff is present in the sheet music. If an additional staff is present, the device 102 may loop (1030) to step 1012 and repeat steps 1012-1026 for the additional staff.

If the additional staff is not present, the device 102 may display (1032) musical symbols and/or electronic symbols. In a first example, the device 102 may display the sheet music without the associated electronic symbols, using the notes and note values obtained to provide additional functionality to the sheet music. In a second example, the device 102 may display the sheet music with the associated electronic symbols, such as overlaid above the sheet music. In this example, the user may see the electronic symbols and may modify the electronic symbols to correct mistakes or to modify the underlying sheet music. In a third example, the device 102 may display electronic sheet music using the electronic symbols. In this example, the device 102 does not display the sheet music and may provide the electronic symbols in various formats and/or magnification not available using the sheet music.

FIG. 11 illustrates an example of sheet music and corresponding electronic music according to embodiments of the present disclosure. As illustrated in FIG. 11, sheet music 1110 may include musical symbols such as musical symbol 1115. The device 102 may generate electronic music 1130 including notes, such as note 1135, and note values, such as note value 1136, based on the musical symbols included in the sheet music 1110. The device 102 may determine the notes and note values based on information included in the sheet music 1110, such as a location of the notes on the staff, a clef associated with the staff and a type of musical symbol displayed. While FIG. 11 illustrates the notes in the electronic music 1130 as hashed ovals, this is for ease of illustration and electronic symbols generated from the notes and note values may be visually represented similarly to the musical symbols displayed in the sheet music 1110.

Figure 12A:
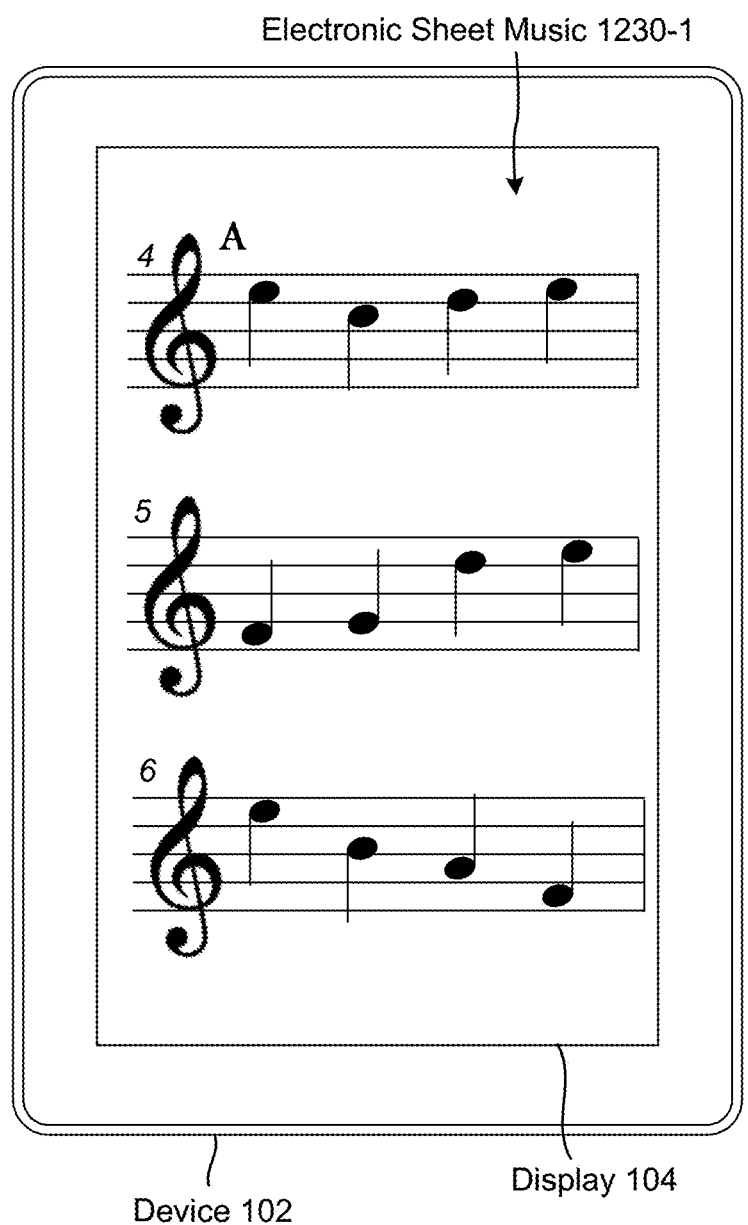
FIGS. 12A-12B illustrate examples of magnified electronic sheet music according to embodiments of the present disclosure.
Figure 12B:
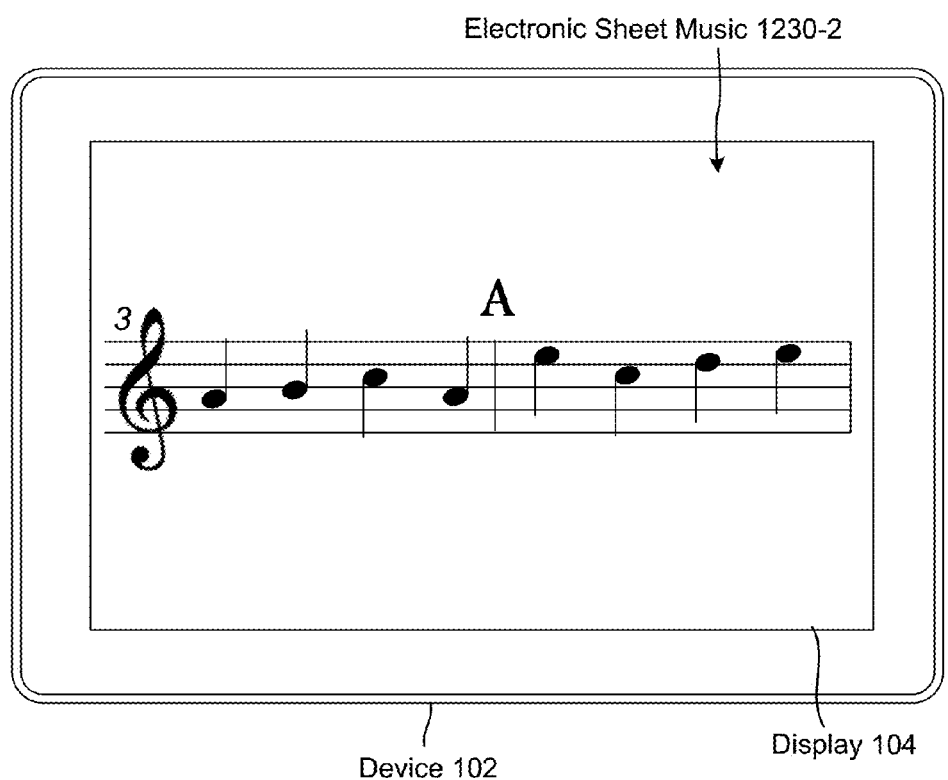

FIGS. 12A-12B illustrate examples of magnified electronic sheet music according to embodiments of the present disclosure. As discussed above, the device 102 may display electronic sheet music using the electronic symbols associated with the sheet music. As a result, the device 102 may provide the electronic sheet music in various formats and/or magnifications not available while displaying the sheet music. As illustrated in FIG. 12A, for example, the device 102 may magnify the electronic sheet music 1230-1 so that a measure stretches across a horizontal length of the display 104 while in a portrait orientation. The device 102 may reflow the electronic sheet music 1230-1, for example by rearranging measures and electronic symbols, so that a user may see the electronic sheet music in order at a greater magnification. FIG. 12B illustrates a second example of magnifying the electronic sheet music, but in a landscape orientation. As illustrated in FIG. 12B, the device 102 may magnify the electronic sheet music 1230-2 so that a measure stretches across a horizontal length of the display 104. As discussed above, the device 102 may reflow the electronic sheet music 1230-2, for example by rearranging measures and electronic symbols, so that a user may see the electronic sheet music in order at a greater magnification. While FIGS. 12A-12B illustrate the electronic sheet music 1230 including notes associated with a single instrument on a staff, the disclosure is not limited thereto. Instead, the electronic sheet music 1230 may display notes for multiple instruments on a single staff.

Figure 13:
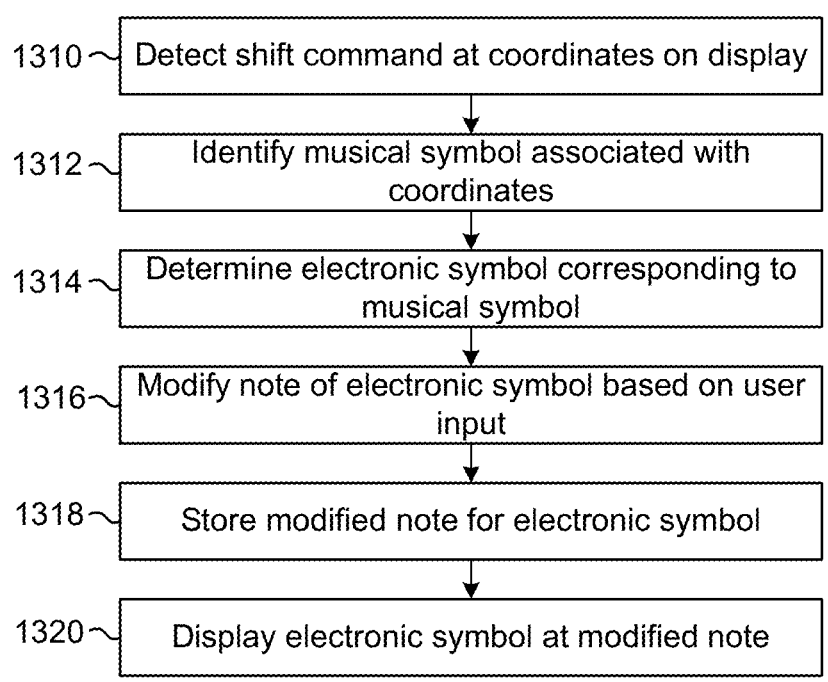
FIG. 13 is a flowchart conceptually illustrating a method of modifying electronic notes according to embodiments of the present disclosure.

FIG. 13 is a flowchart conceptually illustrating a method of modifying electronic notes according to embodiments of the present disclosure. As the device 102 has electronic symbols associated with the sheet music, the device 102 may modify the electronic symbols and allow a user to update the music.

The device 102 may (1310) detect a shift command at coordinates on a display, identify (1312) a musical symbol associated with the coordinates and determine (1314) an electronic symbol corresponding to the musical symbol. In a first example, the device 102 may be displaying an image of sheet music and the device 102 may identify the musical symbol on the sheet music and determine the electronic symbol corresponding to the musical symbol. In a second example, the device 102 may be displaying an image of sheet music with electronic symbols superimposed on the sheet music. In this example, the device 102 may identify the electronic symbol directly based on the coordinates. In a third example, the device 102 may be displaying electronic sheet music and the device 102 may identify the electronic symbol based on the coordinates.

The device 102 may modify (1316) a note (pitch) of the electronic symbol based on user input. For example, the user may click and drag the electronic symbol to a new staff line on the staff corresponding to a separate note. Alternatively, the user may select an electronic symbol, insert a shift command and click on the new staff line to assign the selected electronic symbol to the separate note. The disclosure is not limited thereto and may include any methods known to one of skill in the art for changing a note of the electronic symbol.

The device 102 may store (1318) the modified note for the electronic symbol. For example, the device 102 may store the modified note with the electronic symbols, which may be stored separate from the sheet music, such as in an index, a metadata file or another file associated with the sheet music.

The device 102 may display (1320) an electronic symbol at the modified note. In a first example, the device 102 may display an image of sheet music with the electronic symbol at the modified note, so that a user may see the modified note and the original note. In a second example, the device 102 may display electronic sheet music with the electronic symbol at the modified note along with an indicator of the original note. In a third example, the device 102 may display electronic sheet music with the electronic symbol at the modified note without any indicator of the original note, although the electronic symbol may include a visual representation alerting the user that the electronic symbol is a modified note, such as by using a different color or other methods known to one of skill in the art.

Figure 14:
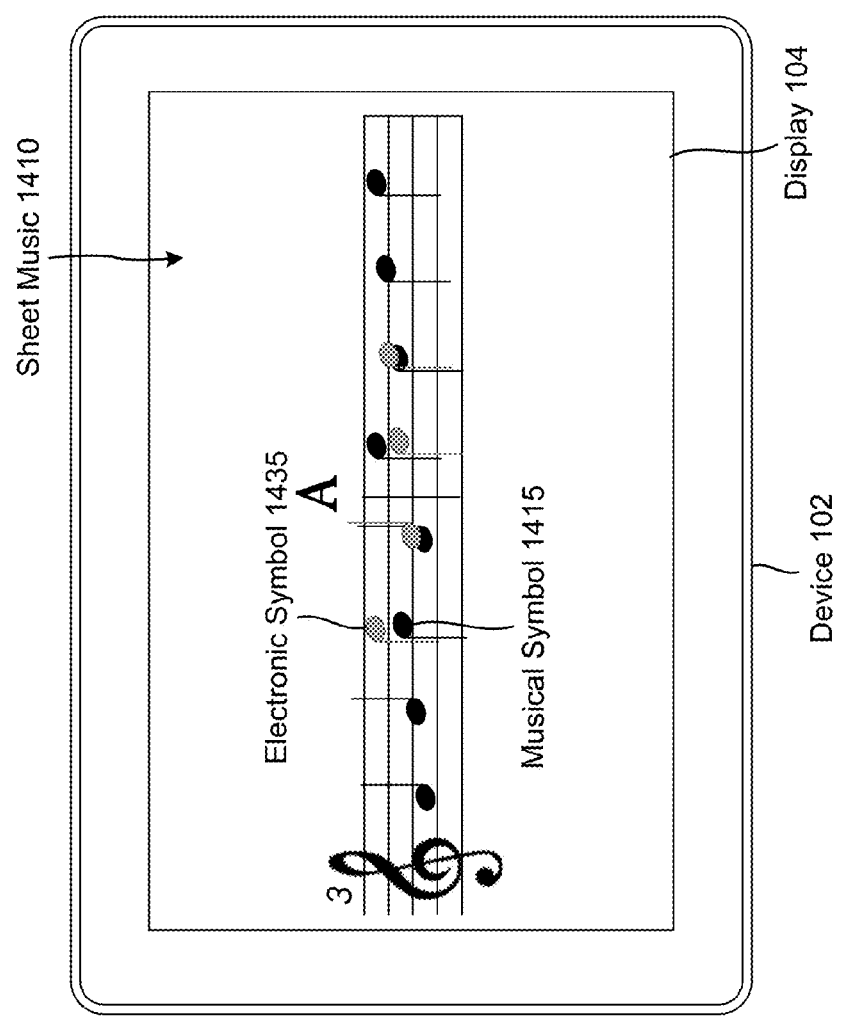
FIG. 14 illustrates an example of displaying modified electronic symbols superimposed on sheet music according to embodiments of the present disclosure.

FIG. 14 illustrates an example of displaying modified electronic symbols superimposed on sheet music according to embodiments of the present disclosure. As illustrated in FIG. 14, sheet music 1410 may display original musical symbols, such as musical symbol 1415, along with electronic symbols, such as electronic symbol 1435. Thus, a user may see the modified electronic symbols superimposed on the musical symbols and may play modified music based on the modified electronic symbols.

Figure 15A:
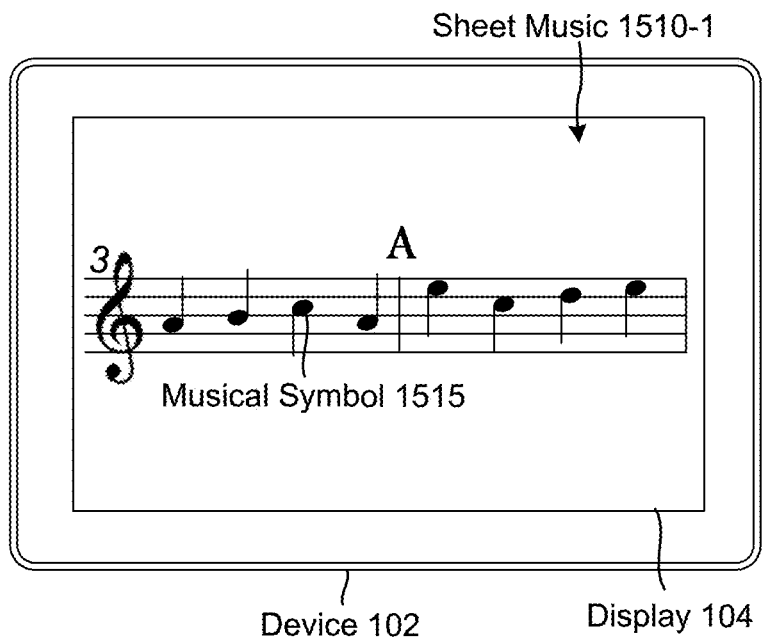
FIGS. 15A-15B illustrate examples of displaying the original electronic notes or the modified electronic notes according to embodiments of the present disclosure.
Figure 15B:
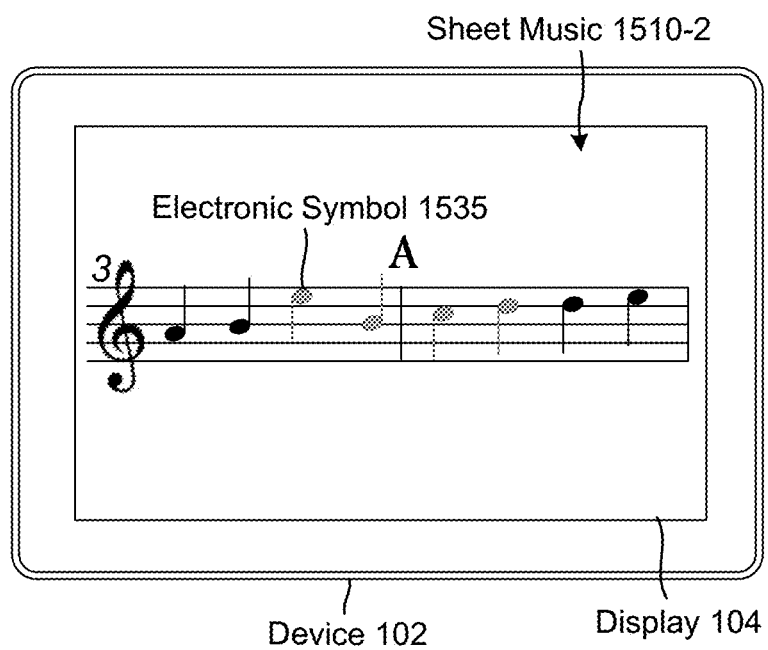

FIGS. 15A-15B illustrate examples of displaying the original musical symbols or the modified electronic symbols according to embodiments of the present disclosure. FIG. 15A illustrates the device 102 displaying sheet music 1510-1, which includes the original musical symbols such as musical symbol 1515. However, the user may instead choose to see modified notes instead of the original musical symbols. Thus, FIG. 15B illustrates the device 102 displaying sheet music 1510-2, which includes some of the original musical symbols along with modified electronic symbols, such as electronic symbol 1535, in place of corresponding original musical symbols. However, while FIG. 15A illustrates the sheet music 1510-1 including musical symbols, the disclosure is not limited thereto. Instead, the sheet music 1510-1 may include the original electronic symbols and the sheet music 1510-2 may include the original electronic symbols and the modified electronic symbols.

Figure 16A:
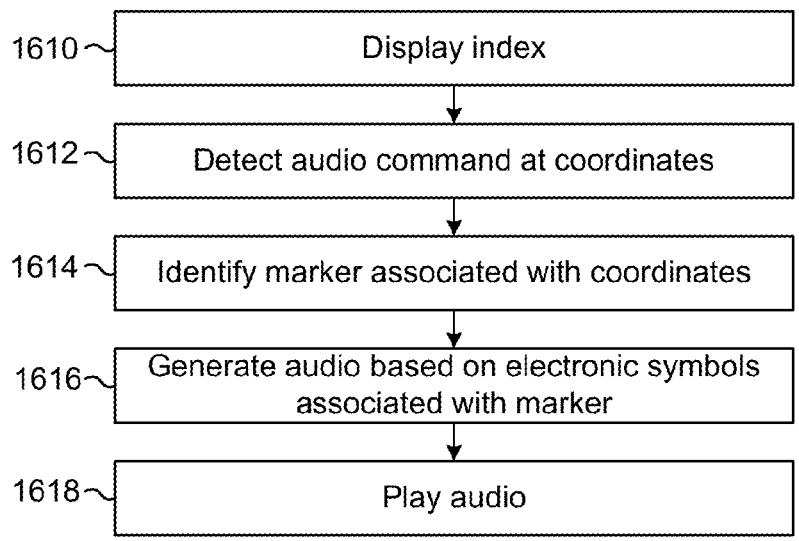
FIGS. 16A-16B are flowcharts conceptually illustrating playing audio based on electronic notes according to embodiments of the present disclosure.
Figure 16B:
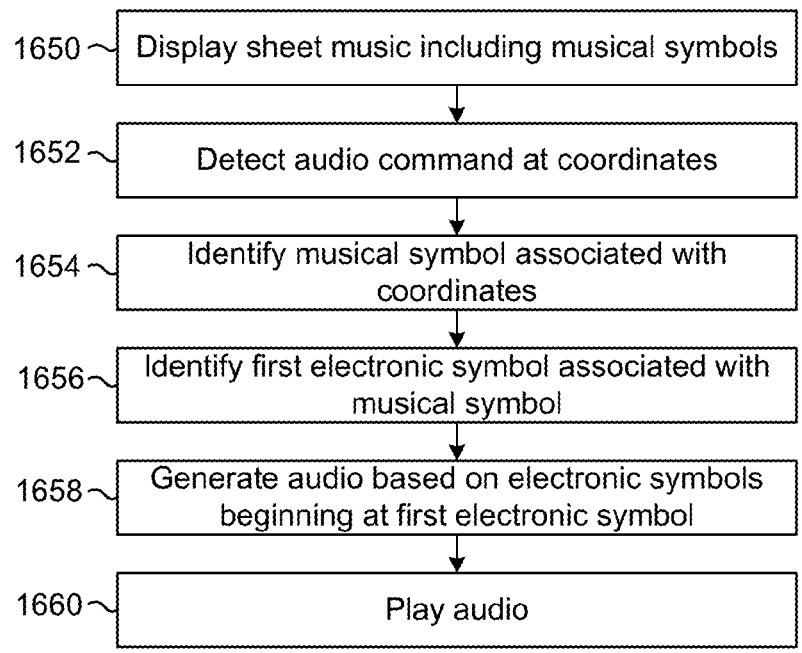

FIGS. 16A-16B are flowcharts conceptually illustrating playing audio based on electronic notes according to embodiments of the present disclosure. FIG. 16A illustrates a flowchart for playing audio from an index, while FIG. 16B illustrates a flowchart for playing audio from the sheet music itself.

As illustrated in FIG. 16A, the device 102 may display (1610) an index including markers. The device 102 may detect (1612) an audio command at coordinates and identify (1614) a marker associated with the coordinates. The device 102 may generate (1616) audio based on electronic symbols associated with the marker and may play (1618) the audio. For example, while viewing the index a user may select a marker. In response, the device 102 may identify the marker and generate and playback audio based on the electronic symbols associated with the marker that are displayed in the index.

As illustrated in FIG. 16B, the device 102 may display (1650) sheet music including musical symbols. For example, the sheet music may be image(s) of sheet music or electronic sheet music. The device 102 may detect (1652) an audio command at coordinates on the display 104 and may identify (1654) a musical symbol associated with the coordinates. The device 102 may identify (1656) a first electronic symbol associated with the selected musical symbol. The device 102 may generate (1658) audio based on electronic symbols associated with the sheet music beginning at the first electronic symbol. The device 102 may play (1660) the generated audio. For example, while viewing sheet music a user may indicate to the device to generate audio using an audio command at a particular musical symbol. In a first example, the device 102 may display an image of sheet music and may identify the first electronic symbol associated with the musical symbol and generate and play the audio based on the electronic symbols subsequent to the first electronic symbol. In a second example, the device 102 may display electronic sheet music and may identify the first electronic symbol directly from the coordinates of the audio command. In this example, the device 102 may generate and play the audio based on the electronic symbols subsequent to the first electronic symbol.

Figure 17:
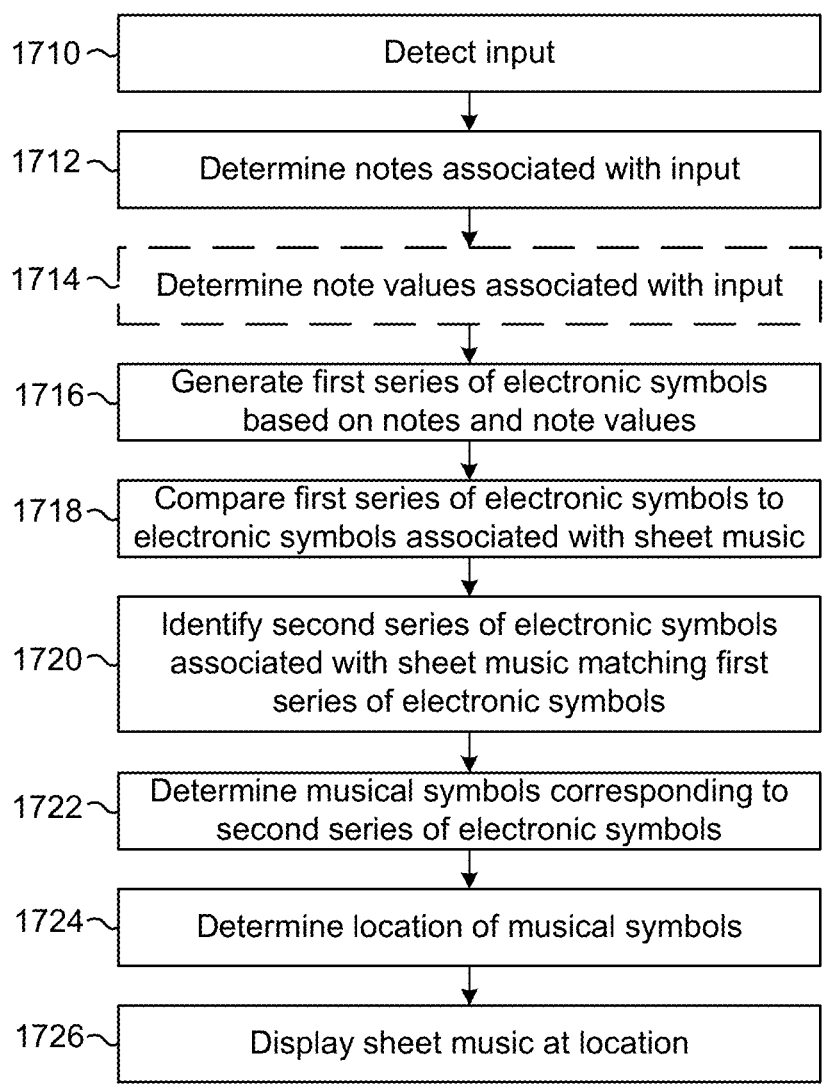
FIG. 17 is a flowchart conceptually illustrating searching for a series of notes in sheet music using electronic notes and displaying the sheet music according to embodiments of the present disclosure.

FIG. 17 is a flowchart conceptually illustrating searching for a series of notes in sheet music using electronic notes and displaying the sheet music according to embodiments of the present disclosure. The device 102 may detect (1710) input to the device 102 indicating a search function command. The device 102 may determine (1712) notes associated with the input and optionally determine (1714) note values associated with the input. In a first example, a user may input a series of notes and corresponding note values and the device 102 may use the notes and note values to identify a particular series of notes. Alternatively, in a second example, a user may input a series of notes and may not know note values associated with the series of notes. The device 102 may use the series of notes without the note values and a corresponding search using the second example may be broader than a search using the first example.

The device 102 may generate (1716) a first series of electronic symbols based no notes and note values and may compare (1718) the first series of electronic symbols to electronic symbols associated with sheet music. The device 102 may then identify (1720) a second series of electronic symbols associated with the sheet music that match the first series of electronic symbols. The device 102 may determine (1722) musical symbols corresponding to the second series of electronic symbols and determine (1724) a location of the musical symbols. The device 102 may then display (1726) the sheet music at the location.

For example, the device 102 may identify location(s) in the sheet music having a particular sequence of musical symbols or notes based on the first series of electronic symbols (generated based on input from the user) and electronic symbols associated with the sheet music. In a first example, the device 102 displays image(s) of sheet music and the device 102 compares the first series of electronic symbols to electronic symbols previously generated that correspond to musical symbols included in the sheet music. In a second example, the device 102 displays electronic sheet music and the device 102 compares the first series of electronic symbols to electronic symbols included in the electronic sheet music.

Figure 18:
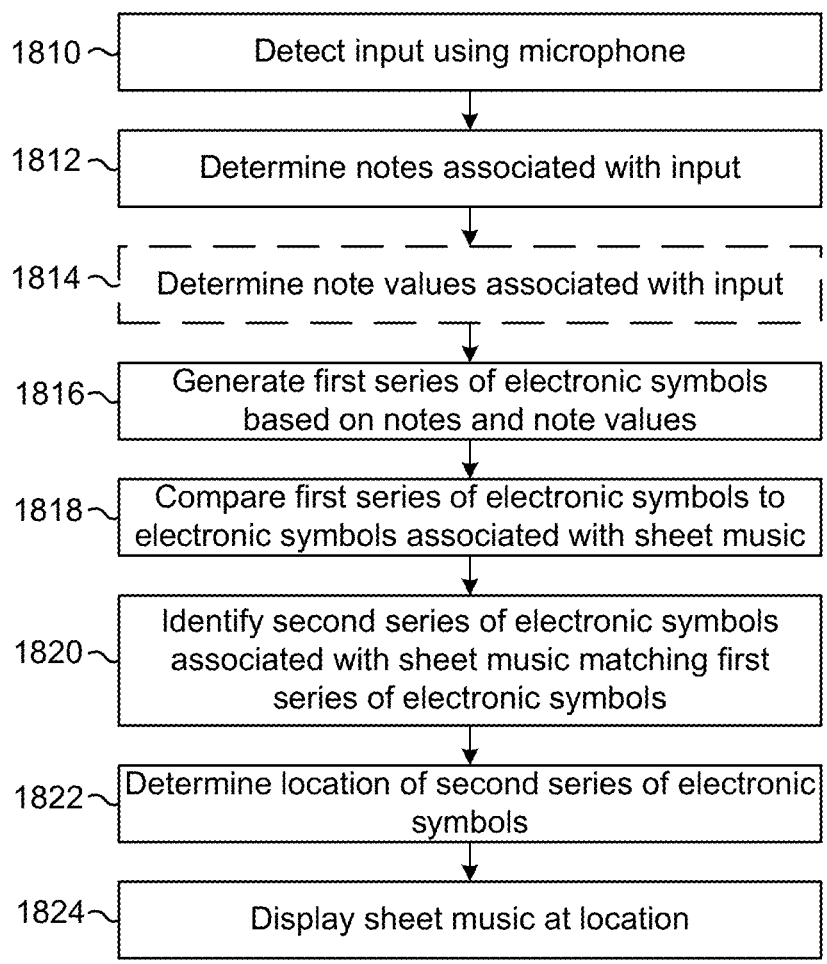
FIG. 18 is a flowchart conceptually illustrating changing a display based on input from a microphone according to embodiments of the present disclosure.

FIG. 18 is a flowchart conceptually illustrating changing a display based on input from a microphone according to embodiments of the present disclosure. Based on the input from the microphone, the device 102 may display a relevant portion of the sheet music or electronic sheet music so that a user is not required to flip between pages of the sheet music.

The device 102 may detect (1810) an input using a microphone. The device 102 may determine (1812) notes associated with the input and optionally determine (1814) note values associated with the input. In a first example, the device 102 may determine the note values to limit a number of potential matches within the sheet music. In a second example, the device 102 may exclude the note values to include potential matches despite the input being slightly incorrect. In a third example, the device 102 may determine a range of note values to compensate for variations in the input.

The device 102 may generate (1816) a first series of electronic symbols based on the notes and note values. The device 102 may compare (1818) the first series of electronic symbols to electronic symbols associated with the sheet music and may identify (1820) second series of electronic symbols associated with the sheet music matching the first series of electronic symbols. The device 102 may determine (1822) a location of the second series of electronic symbols and display (1824) the sheet music at the location.

In a first example, the device 102 may display image(s) of sheet music and may change an image displayed by the device 102 based on the location of the second series of electronic symbols. Thus, a user playing an instrument may see a corresponding page of the sheet music displayed based on the notes being played by the user. In a second example, the device 102 may display electronic sheet music and may update a display or measures displayed based on the location of the second series of electronic symbols. Thus, a user playing an instrument may see a corresponding measure of the sheet music displayed based on the notes being played by the user, or the user may see a continuous advancement of the electronic sheet music in time with the notes being played by the user.

In some embodiments, the device 102 may update the location being displayed based on timing included in the sheet music. For example, if the user is playing an instrument having a rest, the device 102 may continue to update the location based on timing associated with the rest or subsequent measures. In other embodiments, the device 102 may update the location being displayed based on a speed of the input. For example, if the user is playing faster than the sheet music indicates, the device 102 may continue to update the location based on the speed of the user. The disclosure is not limited thereto and the device 102 may update the location based on any methods known to one of skill in the art to assist the user in viewing a corresponding portion of the sheet music/electronic sheet music.

Figure 19A:
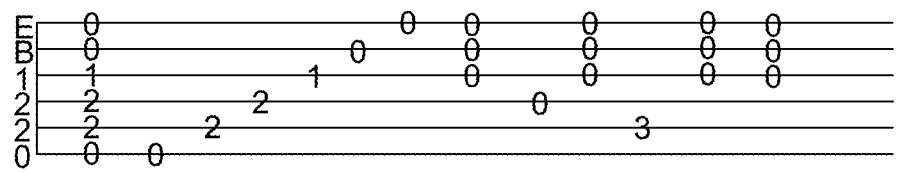
FIGS. 19A-19C illustrate examples of alternative musical notation that may be used with the present system.
Figure 19B:
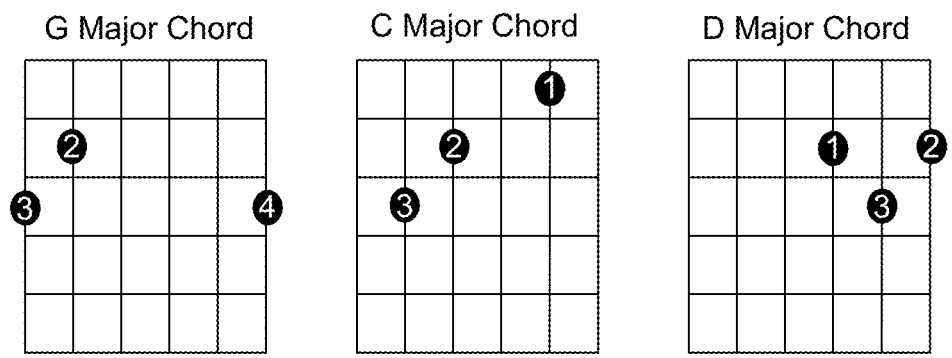
Figure 19C:
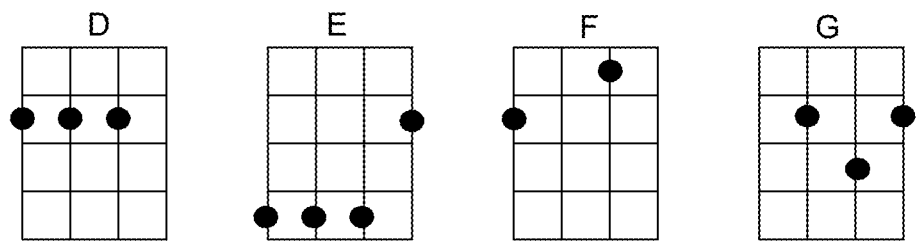

While the disclosure has illustrated examples using modern staff notation, the disclosure is not limited thereto. Instead, device 102 may display any musical notation, such as percussion notation, figured bass notation, lead sheet notation, chord chart notation, shape note notation, tablature or the like. FIGS. 19A-19C illustrate examples of alternative musical notation that may be used with the present system. For example, FIG. 19A illustrates an example of guitar tablature, FIG. 19B illustrates examples of guitar chord charts and FIG. 19C illustrates examples of ukulele chord charts. FIGS. 19A-19C are intended to illustrate some examples of alternative musical notation, but the present disclosure is not limited thereto and may be used with a variety of musical notation schemes.

As shown in FIG. 20, multiple devices may be connected over a network 2020. The network 2020 may include a local or private network or may include a wide network such as the internet. Devices may be connected to the network 2020 through either wired or wireless connections. For example, a smart phone 102c may be connected to the network 2020 through a wireless service provider. Other devices, such as tablet computer 102a, desktop computer 102b, electronic reader 102d, server 2002 and/or keyboard 2010, may connect to the network 2020 through a wired connection. The server 2002 may be configured to receive, store, and manage data related to electronic sheet music and/or electronic musical symbol functionality executed in one or more of the tablet computer 102a, desktop computer 102b, smart phone 102c, electronic reader 102d, stylus 106, etc. For example, the server 2002 may perform any of the steps described above with regard to FIGS. 1A, 1B, 3, 7A, 8, 9, 10, 13, 17 and 18. Alternatively, the server 2002 may receive and store data generated by the tablet computer 102a, desktop computer 102b, smart phone 102c, electronic reader 102d, stylus 106, etc. using any of the steps described above. Thus, the sever 2002 may maintain data, images of sheet music and/or electronic sheet music to allow convenient access to any of the devices connected to the server 2002.

Figure 21:
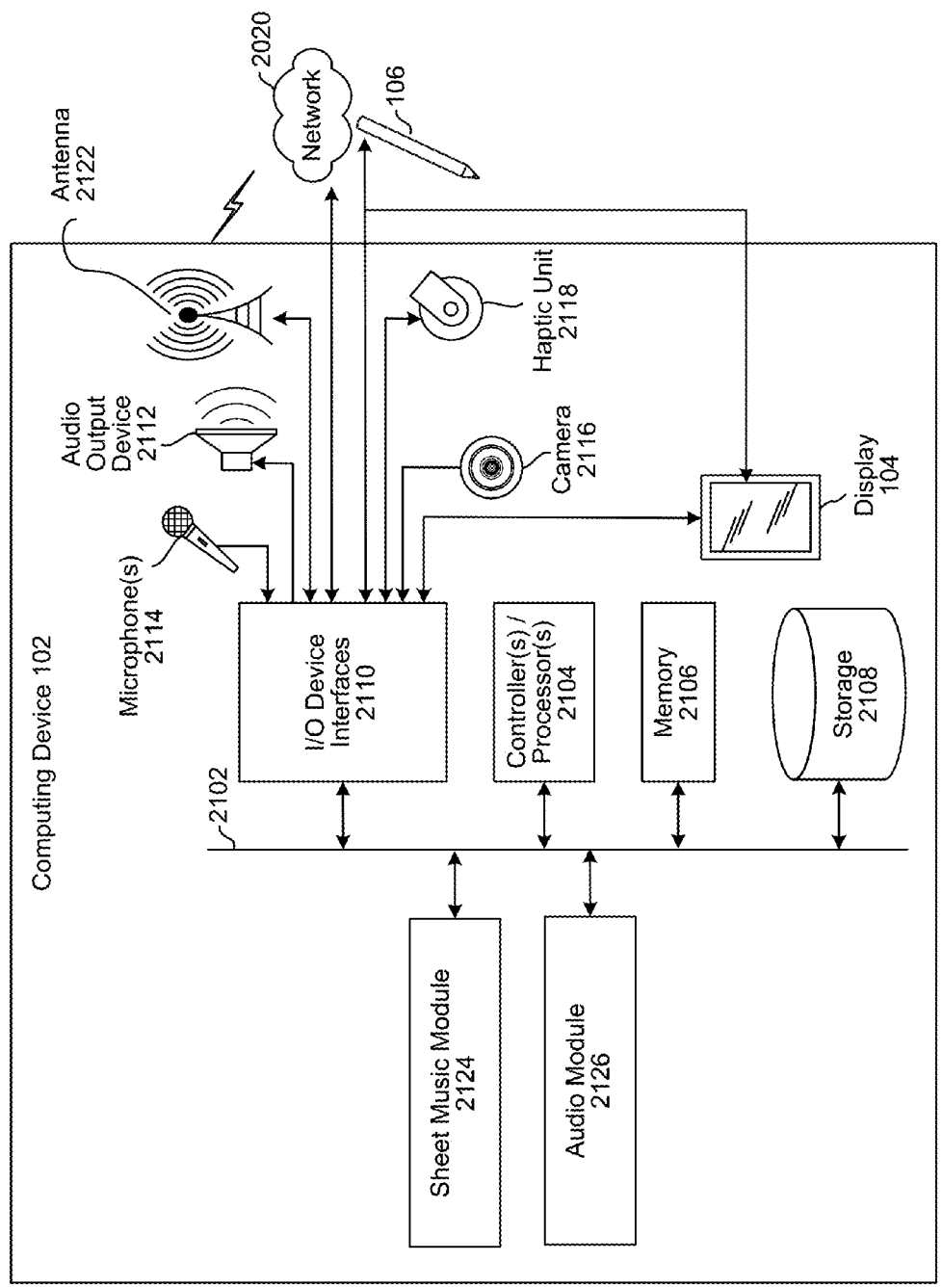
FIG. 21 is a block diagram conceptually illustrating example components of a computing device according to embodiments of the present disclosure.

FIG. 21 is a block diagram conceptually illustrating example components of the computing device 102. In operation, the computing device 102 may include computer-readable and computer-executable instructions that reside on the computing device 102, as is discussed further below.

As illustrated in FIG. 21, the computing device 102 may include an address/data bus 2102 for conveying data among components of the computing device 102. Each component within the computing device 102 may also be directly connected to other components in addition to (or instead of) being connected to other components across the bus 2102.

The computing device 102 may include one or more microcontrollers/controllers/processors 2104 that may each include a central processing unit (CPU) for processing data and computer-readable instructions, and a memory 2106 for storing data and instructions. The memory 2106 may include volatile random access memory (RAM), non-volatile read only memory (ROM), non-volatile magnetoresistive (MRAM) and/or other types of memory. The computing device 102 may also include a data storage component 2108, for storing data and microcontrollers/controller/processor-executable instructions (e.g., instructions to perform one or more steps of the methods illustrated in and described with reference to FIG. 1, 4, 6, 7, 8, 9, 11 or 10). The data storage component 2108 may include one or more non-volatile storage types such as magnetic storage, optical storage, solid-state storage, etc. The computing device 102 may also be connected to removable or external non-volatile memory and/or or storage (such as a removable memory card, memory key drive, networked storage, etc.) through input/output device interfaces 2110.

Computer instructions for operating the computing device 102 and its various components may be executed by the microcontroller(s)/controller(s)/processor(s) 2104, using the memory 2106 as temporary "working" storage at runtime. The computer instructions may be stored in a non-transitory manner in non-volatile memory 2106, storage 2108, or an external device. Alternatively, some or all of the executable instructions may be embedded in hardware or firmware in addition to or instead of software.

The computing device 102 includes input/output device interfaces 2110. A variety of components may be connected through the input/output device interfaces 2110, such as the display or display screen 104 having a touch surface or touchscreen; an audio output device for producing sound, such as speaker(s) 2112; one or more audio capture device(s), such as a microphone or an array of microphones 2114; one or more image and/or video capture devices, such as camera(s) 2116; one or more haptic units 2118; and other components. The display 104, speaker(s) 2112, microphone(s) 2114, camera(s) 2116, haptic unit(s) 2118, and other components may be integrated into the computing device 102 or may be separate.

The display 104 may be a video output device for displaying images. The display 104 may be a display of any suitable technology, such as a liquid crystal display, an organic light emitting diode display, electronic paper, an electrochromic display, a cathode ray tube display, a pico projector or other suitable component(s). The display 104 may also be implemented as a touchscreen and may include components such as electrodes and/or antennae for use in detecting stylus input events or detecting when a stylus is hovering above, but not touching, the display 104, as described above.

The input/output device interfaces 2110 may also include an interface for an external peripheral device connection such as universal serial bus (USB), FireWire, Thunderbolt, Ethernet port or other connection protocol that may connect to networks 2020. The input/output device interfaces 2110 may also include a connection to antenna 2122 to connect one or more networks 2020 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. The stylus 106 may connect to the computing device 102 via one of these connections. The touchscreen of the display 104 and the stylus 106 may also communicate data or operating information to one another to enable the computing device 102 to determine a position of the stylus 106 relative to the touchscreen. The stylus 106 may also communicate to the device 102 (either through the display 104) or otherwise, information about the stylus such as a stylus identifier, user identifier, or other information. Additionally, in some embodiments, the computing device 102 (for example, the touchscreen) and the stylus 106 may communicate using electromagnetic communications (for example, electric fields generated by each device to transmit data on a carrier frequency), and/or haptic communications.

The computing device 102 further includes a sheet music module 2124 and an audio module 2126 that may perform the steps described above with regard to FIGS. 1A, 1B, 3, 7A, 8, 9, 10, 13, 16A-16B, 17 and 18. Some or all of the controllers/modules of the sheet music module 2124 and the audio module 2126 may be executable instructions that may be embedded in hardware or firmware in addition to, or instead of, software. In one embodiment, the computing device 102 may operate using an Android® operating system (such as, Android® 4.3 Jelly Bean and/or Android® 4.4 KitKat).

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc. that can operate with a touchscreen.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware, and/or hardware. Further, the teachings of the disclosure may be performed by an application specific integrated circuit (ASIC), field programmable gate array (FPGA), or other component, for example.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method of displaying sheet music on an electronic reader, the method comprising:
    acquiring sheet music data;
    identifying, using bookmark data embedded in the sheet music data, a marker indicating a reference location of a plurality of reference locations within the sheet music data;
    identifying a type for the marker based on the bookmark data, the type indicating how the marker was created;
    determining the reference location in the sheet music data;
    identifying one or more instruments included in the sheet music data at the reference location;
    acquiring first music data from the sheet music data at the reference location, the first music data including a note and a note value for each musical symbol in a series of musical symbols;
    determining second music data from the first music data for each of the one or more instruments, the second music data including a portion of the first music data associated with each of the one or more instruments;
    updating an index to include the marker, the type of marker, the reference location, the one or more instruments associated with the reference location and the second music data, the index being a navigable index on the electronic reader including a portion of the plurality of reference locations in the sheet music data;
    filtering the index based on the type of marker;
    filtering the index based on the one or more instruments; and
    displaying the filtered index on a display of the electronic reader, wherein the marker is displayed proximate to the second music data.

2. The computer-implemented method of claim 1, wherein the marker is displayed proximate to a combined staff, the combined staff having five evenly spaced lines including a first visual representation of the second music data for a first instrument and a second visual representation of the second music data for a second instrument, the method further comprising:
    detecting a touch input at first coordinates of the display;
    identifying the first coordinates to be proximate to the marker on the display;
    determining that the touch input exceeds a time threshold; and
    displaying a first staff and a second staff, the first staff having five evenly spaced lines including the first visual representation of the second music data for the first instrument and the second staff having five evenly spaced lines including the second visual representation of the second music data for the second instrument.

3. The computer-implemented method of claim 1, further comprising:
    detecting a touch input at first coordinates of the display;
    identifying the first coordinates to be proximate to the marker on the display;
    generating audio using the second music data associated with the marker; and
    outputting the audio.

4. The computer-implemented method of claim 1, further comprising:
    detecting contact at coordinates on the display;

identifying the coordinates to be proximate to the marker on the display;

determining the reference location associated with the marker;

determining a portion of the sheet music data including the first music data using the reference location; and displaying a visual representation of the portion of the sheet music data.

5. A computer-implemented method of displaying sheet music on a device, the method comprising:

identifying, by a device, a first marker indicating a first location of a plurality of reference locations within sheet music data, the sheet music data being an electronic representation of sheet music;

determining the first location in the sheet music data;

acquiring first music data from the sheet music data at the first location, the first music data including a note and a note value for each musical symbol in a first series of musical symbols;

updating an index to include the first marker, the first location and the first music data, the index being a navigable index on the device including a portion of the plurality of reference locations in the sheet music data; and displaying the first marker and at least a portion of the first music data on the device.

6. The computer-implemented method of claim 5, wherein the first marker is displayed proximate to a combined staff, the combined staff having five evenly spaced lines including a first visual representation of a first portion of the first music data for a first instrument and a second visual representation of a second portion of the first music data for a second instrument, the method further comprising:

detecting an input selecting the first marker, the input exceeding a time threshold; and displaying a first staff and a second staff, the first staff having five evenly spaced lines including the first visual representation of the first portion of the first music data and the second staff having five evenly spaced lines including the second visual representation of the second portion of the first music data.

7. The computer-implemented method of claim 5, further comprising:

detecting an input selecting the first marker;

generating audio using the first music data in response to the input; and outputting the audio.

8. The computer-implemented method of claim 5, further comprising:

displaying the index, the index including the first marker and a second marker;

detecting an input selecting the second marker;

determining a second location associated with the second marker using the index;

determining a portion of the sheet music data including the second location; and displaying a visual representation of the portion of the sheet music data in response to the input.

9. The computer-implemented method of claim 8, wherein the first location is within the sheet music data and the second location is within second sheet music data, the second sheet music data stored separately from the sheet music data.

10. The computer-implemented method of claim 5, wherein the acquiring comprises:

identifying the first location in the sheet music data;

determining a series of measures within the sheet music data beginning with the first location, the series of measures including a predetermined number of measures;

identifying musical symbols within the series of measures as the first series of musical symbols; and generating a visual representation of the first series of musical symbols.

11. The computer-implemented method of claim 5, wherein the acquiring comprises:

identifying a staff associated with the first location in the sheet music data, the staff having five horizontal staff lines, the sheet music data including an image of the sheet music;

determining a series of measures within the sheet music data beginning with the first location, the series of measures including a predetermined number of measures;

identifying the first musical symbols on the staff within the series of measures;

determining a pitch indicated by each of the first musical symbols based on the staff and a position of each of the musical symbols relative to the five horizontal staff lines;

determining a duration indicated by each of the first musical symbols based on a shape of each of the first musical symbols; and generating the first music data, the first music data including the pitch and the duration indicated by each of the first musical symbols.

12. The computer-implemented method of claim 5, further comprising:

identifying a type for the first marker, the type indicating how the first marker was created;

identifying one or more instruments included in the sheet music data at the first location;

determining second music data from the first music data for each of the one or more instruments, the second music data including a portion of the first music data associated with each of the one or more instruments, updating the index to include the type of marker, the one or more instruments and the second music data;

filtering the index based on the type of marker;

filtering the index based on the one or more instruments; and displaying the filtered index, wherein the first marker is displayed proximate to the second music data.

13. A computing device, comprising:

at least one processor;

a memory device including instructions operable to be executed by the at least one processor to cause the device to:

identify a first marker indicating a first location of a plurality of reference locations within sheet music data, the sheet music data being an electronic representation of sheet music;

determine the first location in the sheet music data;

acquire first music data from the sheet music data at the first location, the first music data including a note and a note value for each musical symbol in a first series of musical symbols;

update an index to include the first marker, the first location and the first music data, the index being a navigable index on the device including a portion of the plurality of reference locations in the sheet music data; and display the first marker and at least a portion of the first music data on the device.

14. The computing device of claim 13, wherein the first marker is displayed proximate to a combined staff, the combined staff having five evenly spaced lines including a first visual representation of a first portion of the first music data for a first instrument and a second visual representation of a second portion of the first music data for a second instrument, and wherein the instructions further cause the device to:
- detect an input selecting the first marker, the input exceeding a time threshold; and
- display a first staff and a second staff, the first staff having five evenly spaced lines including the first visual representation of the first portion of the first music data and the second staff having five evenly spaced lines including the second visual representation of the second portion of the first music data.

15. The computing device of claim 13, wherein the instructions further cause the device to:
- detect an input selecting the first marker;
- generate audio using the first music data in response to the input; and
- output the audio.

16. The computing device of claim 13, wherein the instructions further cause the device to:
- display the index, the index including the first marker and a second marker;
- detect an input selecting the second marker;
- determine a second location associated with the second marker using the index;
- determine a portion of the sheet music data including the second location; and
- display a visual representation of the portion of the sheet music data in response to the input.

17. The computing device of claim 16, wherein the first location is within the sheet music data and the second location is within second sheet music data, the second sheet music data stored separately from the sheet music data.

18. The computing device of claim 13, wherein the instructions further cause the device to:
- identify the first location in the sheet music data;
- determine a series of measures within the sheet music data beginning with the first location, the series of measures including a predetermined number of measures;
- identify musical symbols within the series of measures as the first series of musical symbols; and
- generate a visual representation of the first series of musical symbols.

19. The computing device of claim 13, wherein the instructions further cause the device to:
- identify a staff associated with the first location in the sheet music data, the staff having five horizontal staff lines, the sheet music data including an image of the sheet music;
- determine a series of measures within the sheet music data beginning with the first location, the series of measures including a predetermined number of measures;
- identify the first musical symbols on the staff within the series of measures;
- determine a pitch indicated by each of the first musical symbols based on the staff and a position of each of the musical symbols relative to the five horizontal staff lines;
- determine a duration indicated by each of the first musical symbols based on a shape of each of the first musical symbols; and
- generate the first music data, the first music data including the pitch and the duration indicated by each of the first musical symbols.

20. The computing device of claim 13, wherein the instructions further cause the device to:
- identify a type for the first marker, the type indicating how the first marker was created;
- identify one or more instruments included in the sheet music data at the first location;
- determine second music data from the first music data for each of the one or more instruments, the second music data including a portion of the first music data associated with each of the one or more instruments,
- update the index to include the type of marker, the one or more instruments and the second music data;
- filter the index based on the type of marker;
- filter the index based on the one or more instruments; and
- display the filtered index, wherein the first marker is displayed proximate to the second music data.

* * * * *